US012718545B2

(12) United States Patent
Jang et al.

(10) Patent No.: US 12,718,545 B2
(45) Date of Patent: Aug. 25, 2026

(54) METHOD FOR GENERATING TRAINING DATASET OF NEURAL NETWORK LEARNING MODEL AND ELECTRONIC DEVICE INCLUDING THE METHOD

(71) Applicant: SAMSUNG ELECTRONICS CO., LTD., Suwon-si (KR)

(72) Inventors: Soongeun Jang, Suwon-si (KR); Woo-Shik Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 261 days.

(21) Appl. No.: 18/420,407

(22) Filed: Jan. 23, 2024

(65) Prior Publication Data

US 2024/0249513 A1 Jul. 25, 2024

(30) Foreign Application Priority Data

Jan. 25, 2023 (KR) ........................ 10-2023-0009541

(51) Int. Cl.
*G06V 10/82* (2022.01)

(52) U.S. Cl.
CPC .................................... *G06V 10/82* (2022.01)

(58) Field of Classification Search
CPC ........ G06V 10/82; G06V 10/70; G06V 10/72; G06V 10/772; G06V 10/774; G06V 10/7747; G06V 10/776; G06V 30/1914; G06V 30/19147; G06T 2207/10052; G06T 7/557

See application file for complete search history.

(56) References Cited

U.S. PATENT DOCUMENTS 11,544,862 B2 * 1/2023 Bae ...................... H04N 23/815
2014/0078259 A1 3/2014 Hiramoto et al.
2015/0201176 A1 * 7/2015 Graziosi .............. H04N 13/243 348/43
2016/0360177 A1 * 12/2016 Graziosi ................ G06T 15/00
2018/0070066 A1 3/2018 Knight et al.

(Continued)

FOREIGN PATENT DOCUMENTS

CN 112950475 A * 6/2021 ............. G06N 3/045
CN 112381711 B 7/2022
KR 10-2024-0032515 A 3/2024

OTHER PUBLICATIONS

J. Jin, J. Hou, J. Chen, H. Zeng, S. Kwong and J. Yu, "Deep Coarse-to-Fine Dense Light Field Reconstruction With Flexible Sampling and Geometry-Aware Fusion," in IEEE Transactions on Pattern Analysis and Machine Intelligence, vol. 44, No. 4, pp. 1819-1836, Apr. 1, 2022 (Year: 2022).*

(Continued)

*Primary Examiner* — Utpal D Shah
*Assistant Examiner* — Jack Peter Kraynak
(74) *Attorney, Agent, or Firm* — Sughrue Mion, PLLC

(57) ABSTRACT

A method of generating a training dataset of a neural network learning model of an electronic device includes: receiving an open images dataset; generating a target image from the open images dataset; generating an input image from the open images dataset; and generating a training dataset of a neural network learning model for compensating for an image captured by an image sensor that includes a meta-prism and a pixel array, the training dataset including the target image and the input image.

18 Claims, 21 Drawing Sheets

(56) References Cited

U.S. PATENT DOCUMENTS

| | | | | |
|---|---|---|---|---|
| 2021/0126032 | A1 | 4/2021 | Roh et al. | |
| 2022/0108424 | A1* | 4/2022 | Gan | G06T 3/4015 |
| 2022/0130015 | A1* | 4/2022 | Yun | H04N 19/186 |
| 2022/0137268 | A1 | 5/2022 | Yun et al. | |
| 2022/0165052 | A1* | 5/2022 | Gan | G06V 10/774 |
| 2023/0134491 | A1* | 5/2023 | Sato | G06V 20/70 |
| 2023/0237790 | A1* | 7/2023 | Valentine | G06V 10/7715 382/157 |
| 2024/0079430 | A1 | 3/2024 | Cho et al. | |
| 2025/0039561 | A1 | 1/2025 | Jang et al. | |

OTHER PUBLICATIONS

C. Kim, H. Zimmer, Y. Pritch, A. Sorkine-Hornung, and M. Gross, "Scene reconstruction from high spatio-angular resolution light fields," ACM Trans. Graph., vol. 32, No. 4, 2013, Art. No. 73.Synthetic Light Field Archive. 2013. (Year: 2013).*

Kalantari, N.K., Wang, T., & Ramamoorthi, R. (2016). Learning-based view synthesis for light field cameras. ACM Transactions on Graphics (TOG), 35, 1-10. (Year: 2016).*

Rerábek, M., & Ebrahimi, T. (2016). New Light Field Image Dataset. International Workshop on Quality of Multimedia Experience. (Year: 2016).*

Y. Tan et al., "CrossNet++: Cross-Scale Large-Parallax Warping for Reference-Based Super-Resolution," in IEEE Transactions on Pattern Analysis and Machine Intelligence, vol. 43, No. 12, pp. 4291-4305, Dec. 1, 2021, doi: 10.1109/TPAMI.2020.2997007. (Year: 2021).*

Zhen Cheng et al., "Light Field Super-Resolution with Zero-Shot Learning", Proceedings of the IEEE/CVF Conference on Computer Vision and Pattern Recognition (CVPR), Jun. 2021, pp. 10010-10019.

Sony Semiconductor Solutions Group, "Image Sensor for Mobile; All-pixel Auto Focus (AF) Technology", 2023, 8 pages, url: https://www.sony-semicon.com/en/technology/mobile/autofocus.html.

GSMArena, "Xiaomi 12S Ultra review", Jul. 15, 2022, 6 pages, url: https://www.gsmarena.com/xiaomi_12s_ultra-review-2450p5.php.

Martin Řeřábek et al., "New Light Field Image Dataset", Proceedings of the 8th International Conference on Quality of Multimedia Experience (QoMEX), Jun. 2016, 2 pages.

Rodrigo C. Daudt et al., "Lytro Illum Light Field Dataset", 3 pages, retrieved 2024, url: https://www.irisa.fr/temics/demos/IllumDatasetLF/index.html.

* cited by examiner

MP

MP_G

| 131 | 132 | 131 | 132 | 131 | 132 |
|---|---|---|---|---|---|
| 133 | 134 | 133 | 134 | 133 | 134 |
| 131 | 132 | 131 | 132 | 131 | 132 |
| 133 | 134 | 133 | 134 | 133 | 134 |
| 131 | 132 | 131 | 132 | 131 | 132 |
| 133 | 134 | 133 | 134 | 133 | 134 |

ML
PX
15
15
IMG1
IMG2-1
IMG2-2
IMG2-3
FIRST TIME POINT(IMG3-1)
SECOND TIME POINT(IMG3-2)
THIRD TIME POINT(IMG3-3)
FOUR TIME POINT(IMG3-4)
MP PSF
MP PSF
MP PSF
MP PSF
IMG3
IMG4
IMG5
(=Input)

Figure 9:
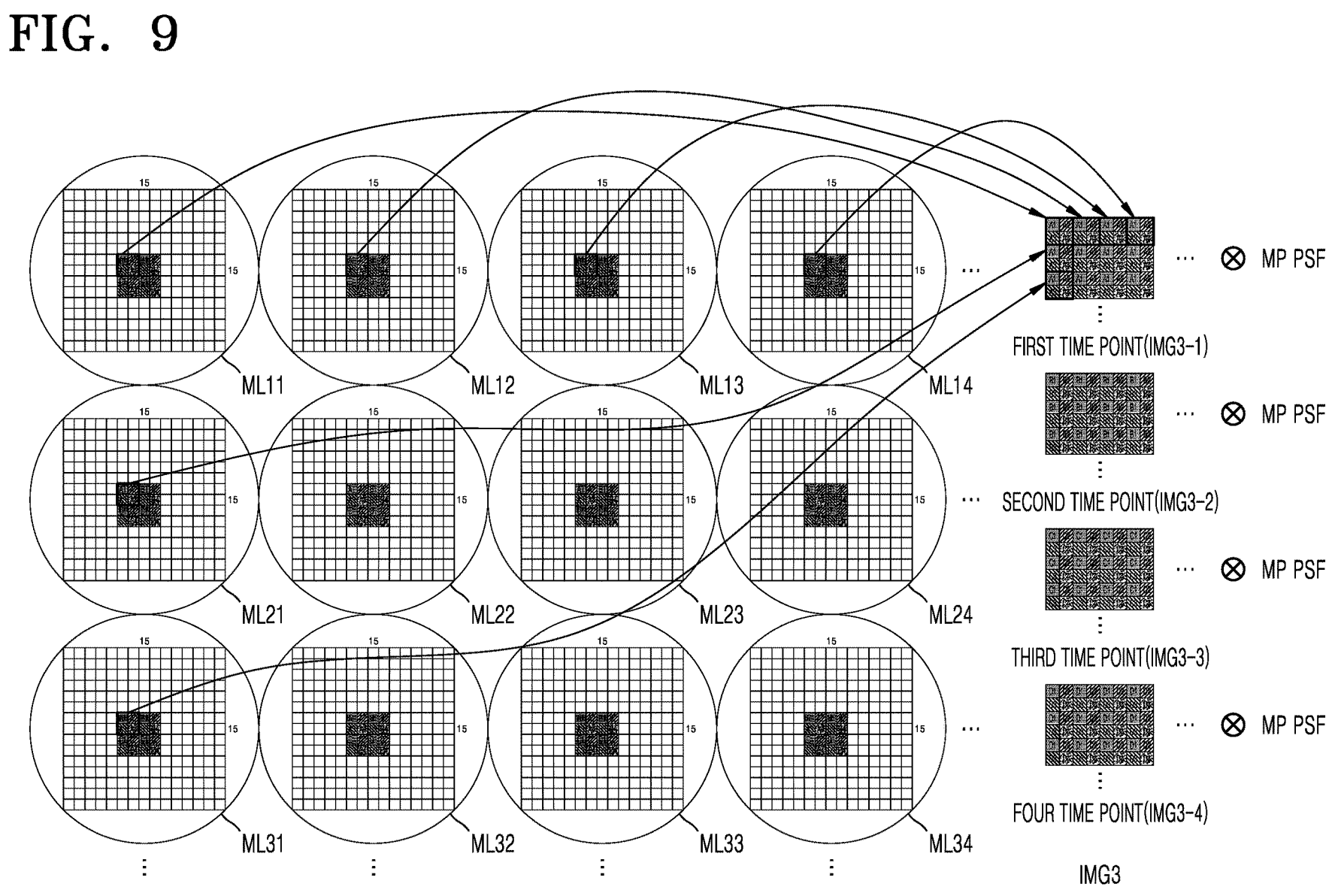

FIRST TIME POINT(IMG3-1) ⊗ MP PSF
SECOND TIME POINT(IMG3-2) ⊗ MP PSF
THIRD TIME POINT(IMG3-3) ⊗ MP PSF
FOUR TIME POINT(IMG3-4) ⊗ MP PSF

IMG3

FIG. 10

| G (−3,3) | G (−1,3) | R (1,3) | R (3,3) |
|---|---|---|---|
| G (−3,1) | G (−1,1) | R (1,1) | R (3,1) |
| B (−3,−1) | B (−1,−1) | G (1,−1) | G (3,−1) |
| B (−3,−3) | B (−1,−3) | G (1,−3) | G (3,−3) |

FIG. 11

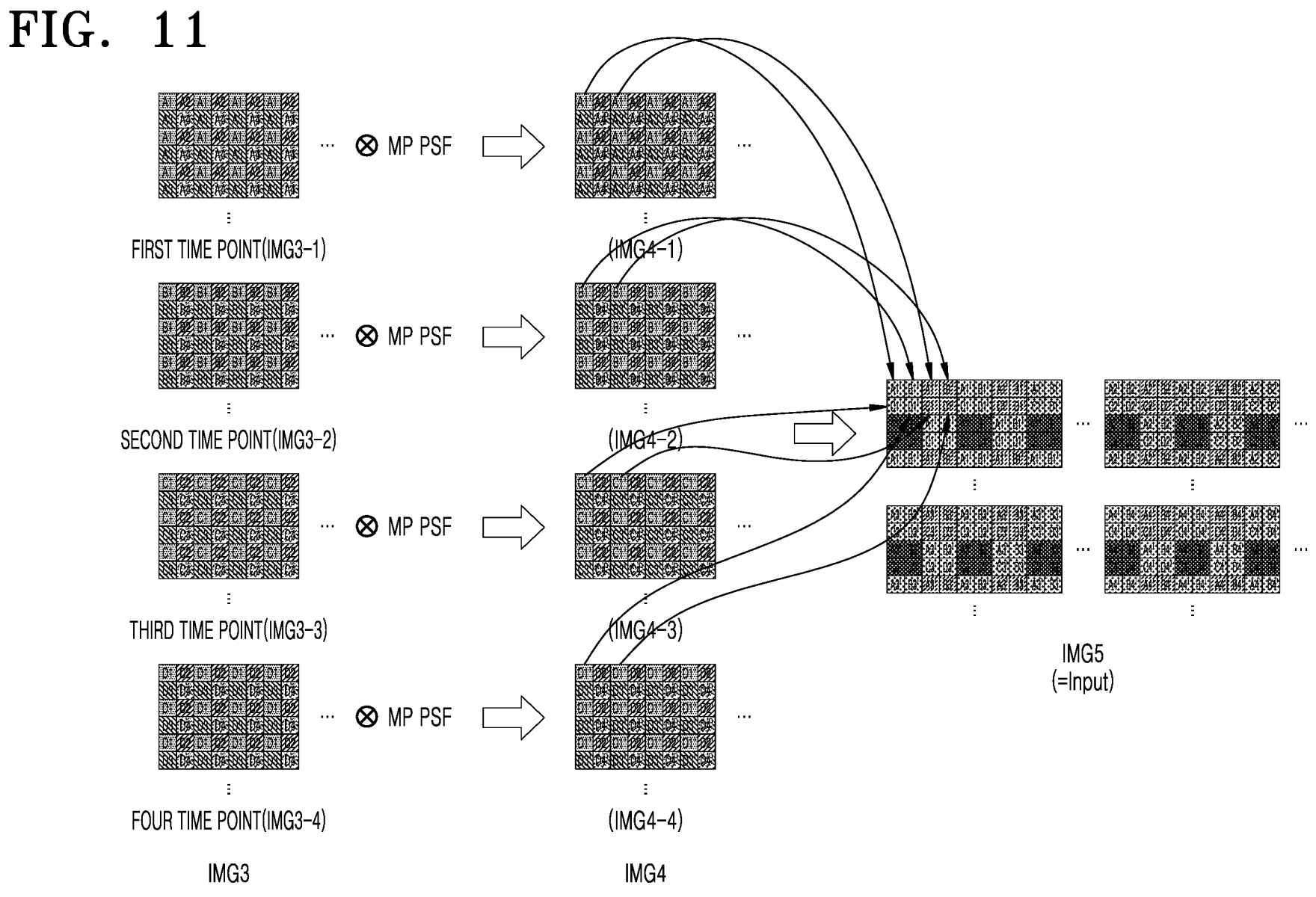

FIRST TIME POINT(IMG3-1)

SECOND TIME POINT(IMG3-2)

THIRD TIME POINT(IMG3-3)

FOUR TIME POINT(IMG3-4)

IMG3

⊗ MP PSF

⊗ MP PSF

⊗ MP PSF

⊗ MP PSF (IMG4-1)

(IMG4-2)

(IMG4-3)

(IMG4-4)

IMG4

IMG5
(=Input)

METHOD FOR GENERATING TRAINING DATASET OF NEURAL NETWORK LEARNING MODEL AND ELECTRONIC DEVICE INCLUDING THE METHOD

CROSS-REFERENCE TO RELATED APPLICATION

This application is based on and claims priority under 35 U.S.C. § 119 to Korean Patent Application No. 10-2023-0009541, filed on Jan. 25, 2023, in the Korean Intellectual Property Office, the disclosure of which is incorporated by reference herein in its entirety.

BACKGROUND

1. Field

The disclosed embodiments relates to a method for generating a training dataset of a neural network learning model, and more particularly, to techniques for generating a training dataset for a learning model so as to improve the resolution of an image sensor that includes a meta-prism array.

2. Description of the Related Art

In order to capture color images, an image sensor traditionally includes a red color filter, a green color filter, and a blue color filter that have certain patterns and are arranged on an optical sensing pixel. For example, a color filter may have a quad Bayer pattern in which 2×2 pixels of the same color are located under one microlens.

In order to improve light utilization efficiency, an image sensor may include a meta-prism array instead of a microlens to allow an optical component of the same color to be incident from a peripheral pixel in addition to an optical component of a specific color incident on the corresponding pixel.

Since an image sensor that includes a meta-prism can receive only one of red color, green color and blue color in one pixel, demosaicing processing is typically required to include all of red color information, green color information, and blue color information in one pixel. However, when a plurality of pixels are arranged under one meta-prism, parallax between the plurality of pixels occurs, and thus, parallax restoration processing is required for demosaicing processing.

In this case, a complicated calculation process is required, and when a neural network is used in a system having a large amount of missing data, good performance may be achieved.

SUMMARY

While utilizing large dataset (e.g., a dataset of a light field image sensor) for training a learning model of a neural network has been utilized, due to differences between an image sensor as described below, a used lens, and design parameters, an open images dataset may not be used as it is.

A dataset including an input image (or Input) and a target image (or Ground truth) capable of performing neural network learning by modeling the image sensor from the open images dataset may be be generated.

Additional aspects will be set forth in part in the description which follows and, in part, will be apparent from the description, or may be learned by practice of the disclosed embodiments.

A method of generating a training dataset of a neural network learning model of an electronic device may include: receiving an open images dataset; generating a target image from the open images dataset; generating an input image from the open images dataset; and generating a training dataset of a neural network learning model for compensating for an image captured by an image sensor that includes a meta-prism and a pixel array, the training dataset including the target image and the input image.

The generating the target image may include sampling the open images dataset to generate a first image dataset based on parallax between pixels of the image sensor.

The target image may include the first image dataset.

The generating the target image may further include: generating a plurality of second image datasets having a sub-pixel shift relationship with the first image dataset; and averaging the first image dataset and each of the plurality of second image datasets to generate a synthesized image.

The plurality of second image datasets may include a (2-1)-th image dataset corresponding to a right adjacent pixel of the first image dataset, a (2-2)-th image dataset corresponding to a lower adjacent pixel of the first image dataset, and a (2-3)-th image dataset corresponding to a right lower orthogonal-side adjacent pixel of the first image dataset.

The target image may be the synthesized image.

The generating the input image may further include: sampling a pixel of each of the plurality of second image datasets having a sub-pixel shift relationship with another pixel according to a time point of the first image dataset to generate a plurality of third image datasets; filtering the plurality of third image datasets based on a point spread function of the meta-prism to generate a fourth image dataset; and sampling the fourth image dataset as a pattern of the pixel array to generate a fifth image dataset.

Each of the pixels included in the first image dataset may include RGB color information.

The point spread function of the meta-prism may have a repeating pattern in a unit of 4×4 matrix and may have different frequency characteristics for each of elements of the 4×4 matrix.

A pattern of the pixel array may include a quad Bayer pattern in which pixels arranged in a 2×2 matrix comprise color filters of a same color, and each of the pixels included in the fourth image dataset comprises only one color information corresponding to the quad Bayer pattern.

The generating the input image may further include half sampling the open images dataset so as to generate the third image dataset.

The open images dataset may be generated by using an image sensor in which a plurality of microlenses are arranged in a matrix shape and which comprises a plurality of pixels under one microlens.

The half sampling may be one-by-one sampling in a horizontal and vertical direction with respect to the microlens from an open images dataset.

The generating the input image may further include, before the half sampling, filtering using a low pass filter having a cut-off frequency corresponding to 70% to 80% of a reference Nyquist frequency.

An electronic device may include: a communication circuit; a memory; and a processor operatively connected to the memory. The memory may be configured to store instructions to receive an open images dataset from the processor during execution of the instructions. The processor may be configured to execute the instructions to: generate a target image from the open images dataset, generate an input image from the open images dataset, and generate a training dataset of a neural network learning model for compensating for an image captured by an image sensor that includes a meta-prism and a pixel array, the training dataset including the target image and the input image.

The processor being configured to execute the instructions to generate the target image may include being configured to perform sampling the open images dataset to generate a first image dataset based on parallax between pixels of the image sensor.

The processor being configured to execute the instructions to generate the target image may further being configured to: generate a plurality of second image datasets having a sub-pixel shift relationship with the first image dataset, and average the first image dataset and each of the plurality of second image datasets to generate a synthesized image.

The processor being configured to execute the instructions to generate the input image may include being configured to: perform sampling of a pixel of each of the plurality of second image datasets having a sub-pixel shift relationship with another pixel according to a time point of the first image dataset to generate a plurality of third image datasets, filter the plurality of third image datasets based on a point spread function of the meta-prism to generate a fourth image data se, and perform sampling of the fourth image dataset as a pattern of the pixel array to generate a fifth image dataset.

The processor being configured to execute the instructions to generate the input image may further include being configured to perform half sampling of the open images dataset to generate the third image dataset.

The processor being configured to execute the instructions to generate the input image may further include being configured to before the half sampling, filter using a low pass filter having a cut-off frequency corresponding to 70% to 80% of a reference Nyquist frequency.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a view for describing a method of sampling a third image according to an embodiment;

FIG. 10 is a view for describing filtering using a point spread function;

FIG. 11 is a view for describing a method for generating a fourth image and a fifth image.

DETAILED DESCRIPTION

Figure 1:
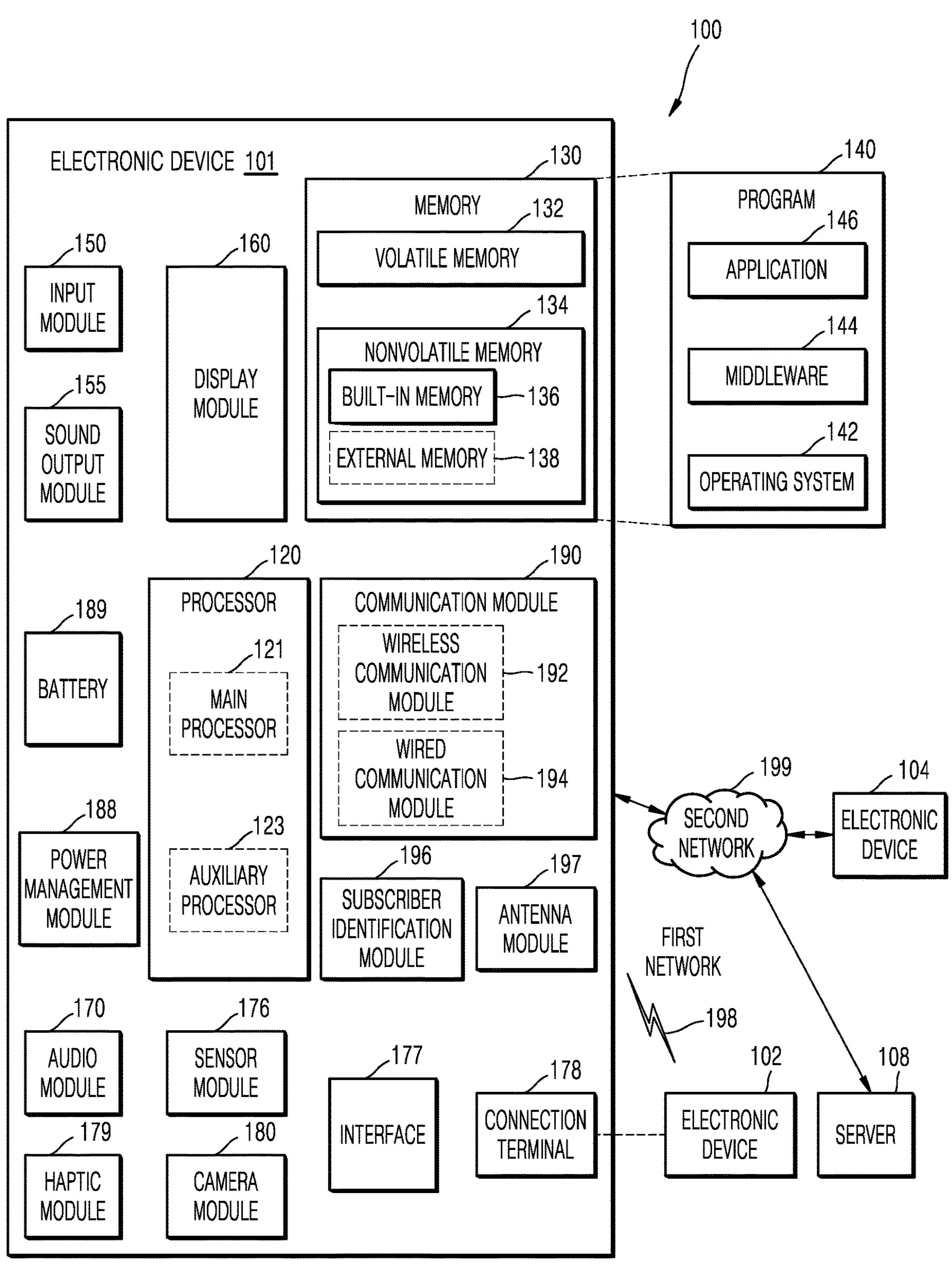
FIG. 1 is a block diagram of an electronic device in a network environment according to various embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. In the following drawings, the same reference numerals refer to the same elements, and in the drawings, the sizes of the elements may be exaggerated for clarity and convenience of explanation. Embodiments to be described below are just illustrative, and various modifications are possible from these embodiments.

Hereinafter, what is referred to as "above" or "on" may include not only directly in a contact manner but also in a non-contact manner. The expression of the singular includes a plurality of representations, unless the context clearly indicates otherwise. In addition, when a certain portion is referred to as "including" any component, this means that other components can be further included, rather than excluding other components unless otherwise stated. The use of the term "said" and similar instruction terms may correspond to both singular and plural.

FIG. 1 is a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network) or may communicate with an electronic device 104 or a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module

188, a battery 189, a communication module 190, a subscriber identification module 196, or an antenna module 197. In some embodiments, at least one (e.g., the connection terminal 178) of these components may be omitted from the electronic device 101, or one or more other components may be added to the electronic device 101. In some embodiments, a portion (e.g., the sensor module 176, the camera module 180, or the antenna module 197) of these components may be integrated with one component (e.g., the display module 160).

The processor 120 may execute, for example, software (e.g., the program 140) to control at least one another component (e.g., a hardware or software component) of the electronic device 101 connected to the processor 120 and may perform various data processing or operations. As at least a portion of data processing or operations, the processor 120 may store commands or data received from another component (e.g., the sensor module 176 or the communication module 190) in a volatile memory 132, may process the commands or data stored in a volatile memory 132 and may store resultant data in a nonvolatile memory 134. The processor 120 may include a main processor 121 (e.g., a central processing unit or an application processor) or an auxiliary processor 123 (e.g., a graphic processing unit, a neural processing unit (NPU), an image signal processor, a sensor hub processor, or a communication processor) that is operable independently or together with the main processor 121. For example, when the electronic device 101 includes the main processor 121 and the auxiliary processor 123, the auxiliary processor 123 may be configured to use lower power than power in the main processor 121 or may be set to be specialized for a designated function. The auxiliary processor 123 may be implemented separately from the main processor 121 or as a part thereof.

The processor 123 may control at least a portion of functions or states related to at least one component (e.g., the display module 160, the sensor module 176, or the communication module 190) among components of the electronic device 101 by replacing the main processor 121 while the main processor 121 is in an active (e.g., sleep) state, or together with the main processor 121 while the main processor 121 is in an active (e.g., application execution) state. The auxiliary processor 123 (e.g., an image signal processor or a communication processor) may be implemented as a part of another component (e.g., the camera module 180 or the communication module 190) functionally related to the auxiliary processor 123. The auxiliary processor 123 (e.g., a neural network processing unit) may include a hardware structure specialized for processing of an artificial intelligence model. The artificial intelligence model may be generated through mechanical learning. The learning may be performed, for example, by the electronic device 101 in which the artificial intelligence is performed, or may be performed via an additional server (e.g., the server 108). A learning algorithm may include, for example, supervised learning, unsupervised learning, semi-supervised learning or reinforcement learning but is not limited to the above-described example. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), bidirectional recurrent deep neural network (BRDNN), deep Q-networks, or a combination of at least two or more networks but is not limited to the above-described example. The artificial intelligence model may additionally or alternatively include a software structure in addition to the hardware structure.

The memory 130 may store various data used by at least one component (e.g., the processor 120 or the sensor module 176) of the electronic device 101. The data may include, for example, software (e.g., the program 140) and input data or output data related to the software. The memory 130 may include a volatile memory 132 or a nonvolatile memory 134.

The program 140 may be stored in the memory 130 as a software, and for example, may include an operation system 142, a middle ware 144, or an application 146.

The input module 150 may receive commands or data to be used in a component (e.g., the processor 120) of the electronic device 101 from an outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as multimedia playback or recording playback. The receiver may be used to receive an incoming call. The receiver may be implemented separately from a speaker or as a part thereof.

The display module 160 may visually provide information to the outside (e.g., the user) of the electronic device 101. The display module 160 may include, for example, a display, a hologram device, or a projector, and a control circuit for controlling the corresponding device. The display module 160 may include a touch sensor set to detect a touch, or a pressure sensor set to measure the intensity of force generated by the touch.

The audio module 170 may convert a sound into an electrical signal and vice versa. The audio module 170 may obtain a sound through the input module 150, or may output a sound through an external electronic device (e.g., the electronic device 102) connected directly or wirelessly to the sound output module 155 or the electronic device 101.

The sensor module 176 may detect the operating state (e.g., power or temperature) of the electronic device 101, or an external environment state (e.g., a user state) and may generate an electrical signal or a data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols that may be used to connect the electronic device 101 directly or wirelessly to the external electronic device (e.g., the electronic device 102). The interface 177 may include, for example, a high definition multimedia interface (HDMI), a universal serial bus (USB) interface, a secure digital (SD) card interface, or an audio interface.

The connection terminal 178 may include a connector through which the electronic device 101 may be physically connected to the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., vibration or movement) or an electrical stimulus which may be recognized by the user via his tactile sensation or kinesthetic sensation. The haptic module 179 may include, for example, a motor, a piezoelectric device, or an electrical stimulus device.

The camera module 180 may capture a still image or a moving image. The camera module 180 may include one or more lens, image sensors, image signal processors, or flashes.

The power management module 188 may manage power supplied to the electronic device 101. The power management module 188 may be implemented as at least a portion of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently from the processor 120 (e.g., an application processor) and support a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication module). The corresponding communication module of these communication modules may communicate with the external electronic device 104 via a first network 198 (e.g., a short-range communication network such as Bluetooth, Wireless Fidelity (IEI) Direct, or an Infrared Data Association) or a second network 199 (e.g., a long-range communication network such as a legacy cellular network, a 5th Generation (5G) network, a next-generation communication network, the Internet, or a computer network (e.g., local area network (LAN) or wide area network (WAN)). Various types of communication modules may be integrated with one component (e.g., a single chip), or may be implemented as a plurality of separate components (e.g., a plurality of chips). The wireless communication module 192 may identify or authenticate the electronic device 101 in a communication network, such as a first network 198 or a second network 199, using subscriber information (e.g., international mobile subscriber identity (IMSI)) stored in the subscriber identification module 196.

The wireless communication module 192 may support a 5G network after a 4th Generation (4G) network and a next-generation communication technology, for example, a new radio (NR) access technology. The NR access technology may support high-speed transmission of an enhanced mobile broadband (eMBB) of high-capacity of data, minimization of terminal power and massive machine type communications (mMTC) or ultra-reliable and low-latency communications (URLLC). The wireless communication module 192 may support, for example, a high-frequency band (e.g., a mmWave band) so as to achieve a high data transmission rate. The wireless communication module 192 may support various technologies for obtaining performance in high-frequency bands, for example, beamforming, massive multiple-input and multiple-output (MIMO), full dimensional MIMO (FD-MIMO), an array antenna, an analog beam-forming, or large scale antenna. The wireless communication module 192 may support various requirements defined in the electronic device 101 and an external electronic device (e.g., the electronic device 104) or a network system (e.g., the second network 199). The wireless communication module 192 may support a peak efficient data rate (e.g., 20 Gbps or more) for realism realization, a loss coverage specification (e.g., 164 dB or less) for realization of MJT, or U-plane latency (e.g., 0.5 ms or less, or round trip 1 ms or less, respectively) for URLLC realization.

The antenna module 197 may transmit a signal or power to the outside (e.g., an external electronic device) or may receive the signal or power from the outside. The antenna module 197 may include an antenna including a conductor formed on a substrate (e.g., a printed circuit board (PCB) or a radiator including a conductive pattern. The antenna module 197 may include a plurality of antennas (e.g., array antennas). In this case, at least one antenna suitable for a communication method used in a communication network such as the first network 198 or the second network 199 may be selected from the plurality of antennas by using the communication module 190, for example. The signal or power may be transmitted or received between the communication module 190 and the external electronic device via the selected at least one antenna. Other component (e.g., a radio frequency integrated circuit (RFIC)) than the radiator may be additionally formed as a part of the antenna module 197.

The antenna module 197 may form a mmWave antenna module. The mmWave antenna module may include a printed circuit board (PCB), an RFIC hinge disposed on or adjacent to a first surface (e.g., a lower surface) of the PCB and capable of supporting a designated high frequency band (e.g., an mmWave band), and a plurality of antennas (e.g., array antennas) disposed on or adjacent to a second surface (e.g., an upper surface or a side surface) of the PCB and capable of transmitting or receiving a signal of the designated high frequency band.

At least some of the above-described components may be mutually connected to each other and may exchange signals (e.g., commands or data) therebetween via an inter-peripheral communication scheme (e.g., a bus, a general purpose input and output (GPIO), a serial peripheral interface (SPI), or a mobile industry processor interface (MIPI)).

The commands or data may be transmitted or received between the electronic device 101 and the external electronic device 104 via the server 108 connected to the second network 199. Each of the external electronic devices 102 and 104 may be a device of the same type as, or a different type, from the electronic device 101. All or some of operations to be executed at the electronic device 101 may be executed at one or more external electronic devices among the external electronic devices 102, 104, and 108. For example, when the electronic device 101 needs to perform a function or a service automatically, or in response to a request from a user or another device, the electronic device 101, instead of executing the function or the service or additionally, may request the one or more external electronic devices to perform at least part of the function or the service. The one or more external electronic devices receiving the request may execute at least a part of the function or the service requested, or an additional function or service related to the request, and may transmit a result of the performing to the electronic device 101. The electronic device 101 may provide the result, with or without further processing of the result, as at least part of a reply to the request. To this end, for example, cloud computing, distributed computing, mobile edge computing (MEC), or client-server computing technology may be used. The electronic device 101 may provide an ultra-low latency service, for example, using distributed computing or mobile edge computing. In another embodiment, the external electronic device 104 may include an Internet of Things (IoT) device. The server 108 may be a server using a mechanical learning and/or a neural network. The external electronic device 104 or the server 108 may be included in the second network 199. The electronic device 101 may be applied to an intelligent service (e.g., a smart home, a smart city, a smart car, or a health care) based on a 5G communication technology and a IoT-related technology.

Figure 2A:
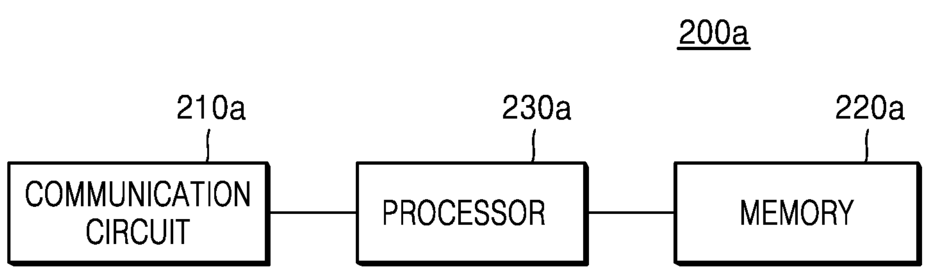
FIG. 2A is a block diagram of an electronic device according to an embodiment.

FIG. 2A is a block diagram of an electronic device according to an embodiment.

Referring to FIG. 2A, an electronic device 200*a* (e.g., the electronic device 101 of FIG. 1) (e.g., a PC or a server) may include a communication circuit 210*a* (e.g., the communication module 190 of FIG. 1), memory 220*a* (e.g., the memory 130 of FIG. 1), and a processor 230*a* (e.g., the processor 120 of FIG. 1). The electronic device 200*a* may train an artificial intelligence learning model independently or while being integrated with an external electronic device (e.g., the electronic devices 102 and 104, the server 108, or the electronic device 200*b* of FIG. 2B). For example, an artificial intelligence learning system may include the electronic device 200*a,* the external electronic device or a combination of the electronic device 200*a* and the external electronic device.

Figure 2B:
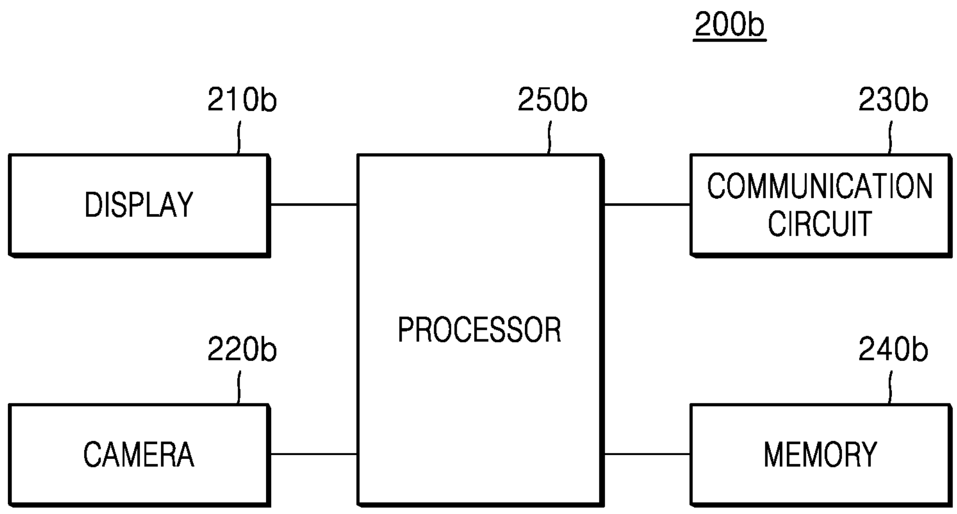
FIG. 2B is a block diagram of an electronic device according to an embodiment.

The communication circuit 210*a* may transmit or receive data to or from the external electronic device (e.g., the electronic devices 102 and 104 of FIG. 1, the server 108 or the electronic device 200*b* of FIG. 2B. For example, the communication circuit 210*a* may transmit or receive an image and/or a moving image to or from an external electronic device. For example, the communication circuit 210*a* may transmit a training dataset (e.g., an input image and a target image) of the artificial intelligence learning model generated by the processor 230*a* to the external electronic device. For example, the communication circuit 210*a* may provide the artificial intelligence learning model to the external electronic device. For example, the communication circuit 210*a* may provide the artificial intelligence learning model for compensating for the trained image to an external electronic device.

The memory 220*a* may include instructions executed by the processor 230*a*. The memory 220*a* may at least temporarily store the image and/or the moving image received from an external electronic device or a network. The memory 220*a* may store a training dataset (e.g., an input image and target image pair) of the artificial intelligence learning model.

The processor 230*a* may control the overall operation of the electronic device 200*a*. The processor 230*a* may learn the artificial intelligence learning model. A system for training the artificial intelligence learning model may be implemented inside the electronic device 200*a* (e.g., the processor 230*a* or 250*b*), outside the electronic device 200*a* or a combination of the electronic device 200*a* and the outside. For example, the artificial learning model may be trained by at least one of the electronic device 200*a* and an external device. For example, the artificial learning system may be trained using federated learning. The artificial learning model may include an image compensation model for compensating for an image. The artificial intelligence learning model may be trained on the basis of at least one of machine learning including at least one of a neural network, a support vector machine (SVN), a hidden Markov model (HMM), and a Bayesian network. The artificial intelligence learning model may search for a pattern from learning data in addition to the aforementioned machine learning, and may be trained on the basis of at least one of various pattern recognition algorithms which may be applied to actual data by using the pattern.

The processor 230*a* may generate a training dataset for training the artificial intelligence learning model. For example, the training dataset may include a pair of input images and target images.

Figure 3A:
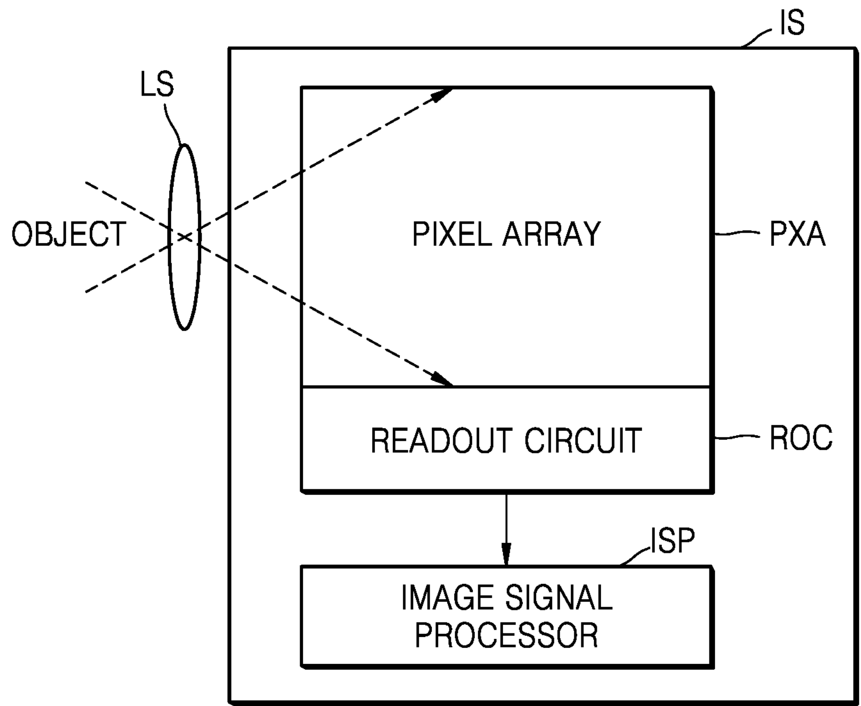
FIG. 3A is a block diagram for describing an image sensor according to an embodiment.
Figure 3B:
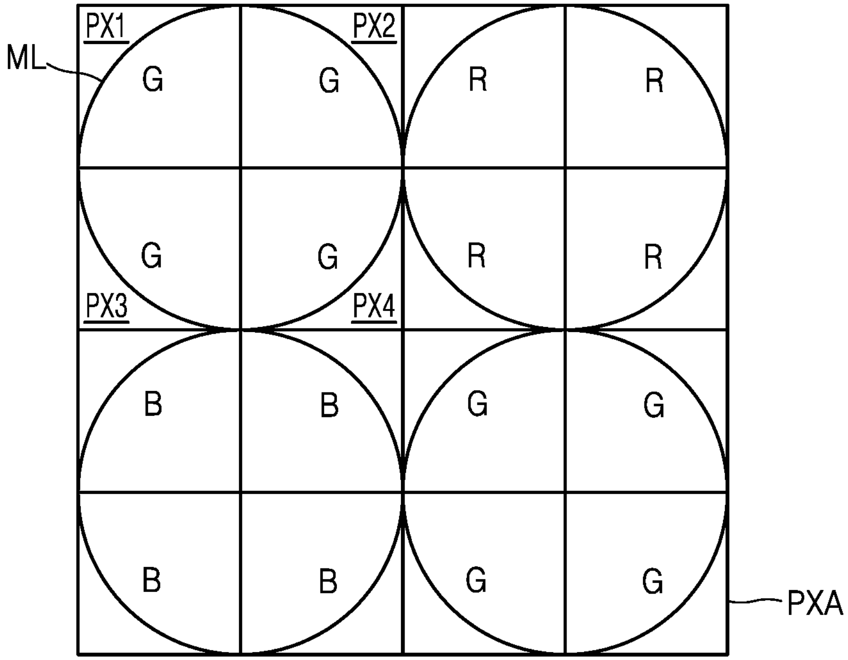
FIG. 3B is a plan view of one region of a pixel array.
Figure 3C:
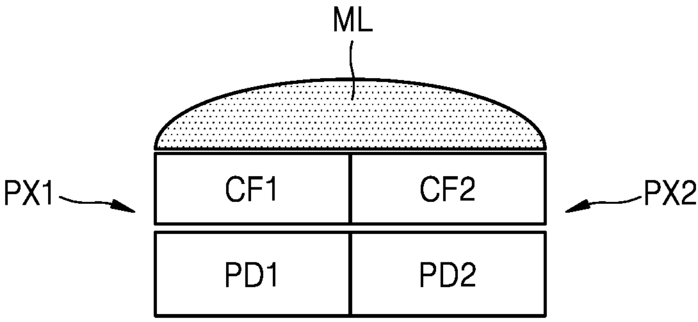
FIG. 3C is a cross-sectional view of one region of a pixel array.
Figure 3D:
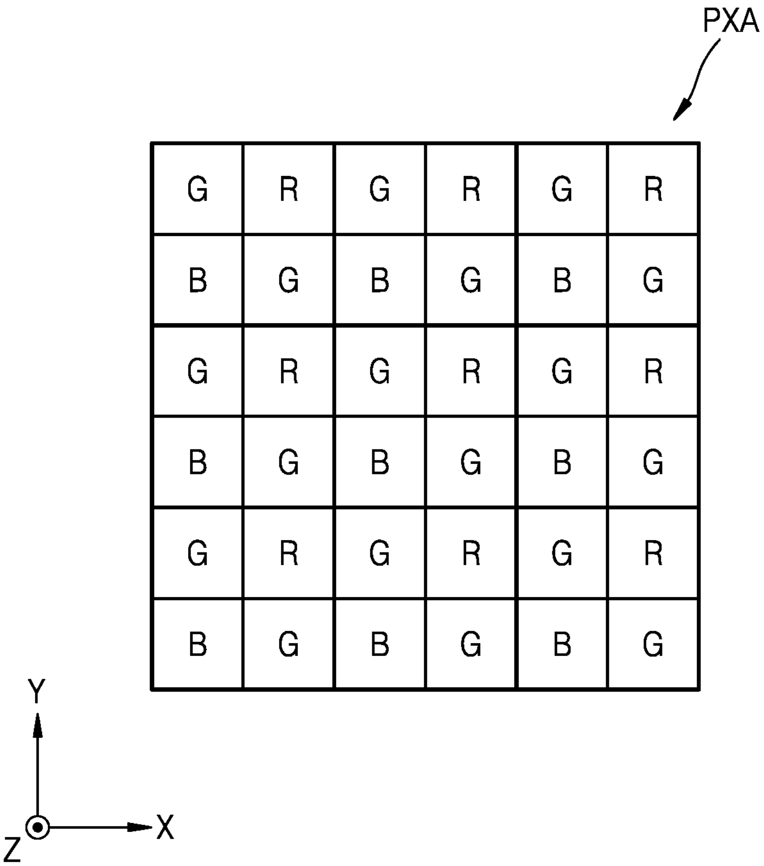
FIG. 3D is a plan view illustrating a color arrangement of a pixel array of an image sensor according to an embodiment.
Figure 3E:
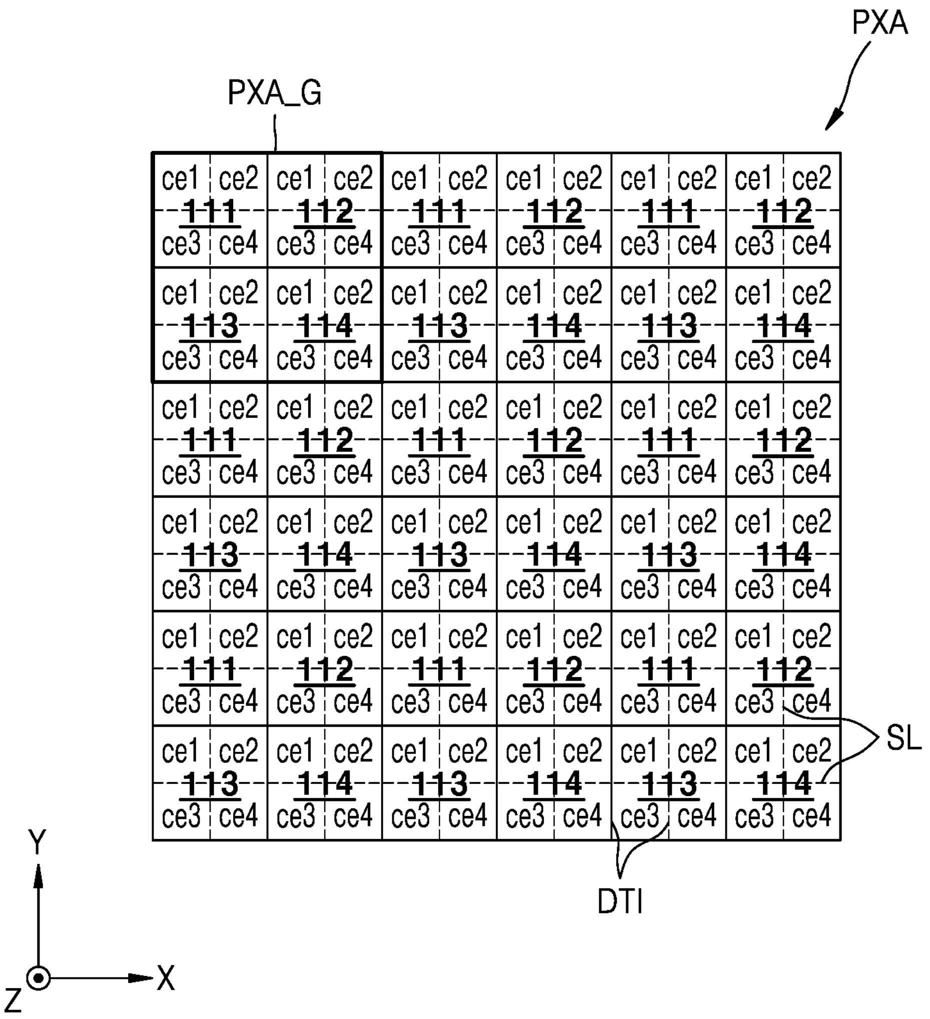
FIGS. 3E and 3F are plan views for describing a pixel array and a meta-prism array of an image sensor according to an embodiment in more detail.
Figure 3F:
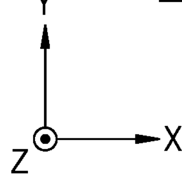

FIG. 2B is a block diagram of an electronic device according to an embodiment. FIG. 3A is a block diagram for describing an image sensor according to an embodiment. FIG. 3B is a plan view of one region of a pixel array. FIG. 3C is a cross-sectional view of one region of a pixel array. FIG. 3D is a plan view illustrating a color arrangement of a pixel array of an image sensor according to an embodiment. FIGS. 3E and 3F are plan views for describing a pixel array and a meta-prism array of an image sensor according to an embodiment in more detail.

Referring to FIG. 2B, an electronic device 200*b* (e.g., the electronic device 101 of FIG. 1) (e.g., a mobile device) may include a display 210*b* (e.g., the display module 160 of FIG. 1), a camera 220*b* (e.g., the camera module 180 of FIG. 1), a communication circuit 230*b* (e.g., the communication module 190 of FIG. 1), memory 240*b* (e.g., the memory 130 of FIG. 1), and a processor 250*b* (e.g., the processor 120 of FIG. 1).

The display 210*b* may display an image and/or a moving image. The display 210*b* may include a plurality of pixels. The display 210*b* may include a wiring for driving pixels.

The camera 220*b* may include an image sensor IS.

Referring to FIG. 3A, the image sensor IS may convert an optical signal of an incident object through the optical lens LS to convert the optical signal into image data.

The image sensor IS may include a pixel array PXA, a readout circuit ROC, and an image signal processor ISP. The pixel array PXA, the readout circuit ROC, and the image signal processor ISP may be implemented with one semiconductor chip or a semiconductor module. The pixel array PXA and the readout circuit ROC may be implemented with one semiconductor chip, and the image signal processor ISP may also be implemented with another semiconductor chip.

The pixel array PXA may be implemented by, for example, photoelectric conversion elements such as charge coupled devices (CCD) or complementary metal oxide semiconductors (CMOSs), and may be implemented by various types of photoelectric conversion elements. The pixel array PXA may include a plurality of pixels for converting a received optical signal (light) into an electrical signal, and the plurality of pixels may be arranged in a matrix. Each of the plurality of pixels includes an optical sensing element. For example, the optical sensing element may include a photodiode, a phototransistor, a photogate, a pinned photodiode, or the like.

The readout circuit ROC may convert electrical signals received from the pixel array PXA into image data. The readout circuit ROC may amplify the electrical signals and may analog-digital convert the amplified electrical signals. The image sensor generated by the readout circuit ROC may include pixel data corresponding to each of the pixels of the pixel array PXA. The readout circuit ROC may constitute a sensing core together with the pixel array PXA.

The image signal processor ISP may perform various image processing on the image data output from the readout circuit ROC. For example, an image signal processor ISP may perform image processing such as bad pixel correction and noise removal with respect to image data.

The image signal processor ISP may output the image-processed image data. The image-processed image data may be provided to an external processor (e.g., 250*b* of FIG. 2B).

Referring to FIGS. 3B and 3C, the pixel array PXA may have a quad Bayer pattern (QBP) structure. Four pixels arranged in a 2×2 matrix (2 rows, 2 columns) may include color filters of the same color. Thus, 4×4 pixels in the pixel array PXA may include 2×2 green pixels G, 2×2 red pixels R, 2×2 blue pixels B, and 2×2 green pixels G.

Each of the pixels included in the pixel array PXA may include a color filter and a light-receiving element (e.g., a photodiode). For example, the first pixel PX1 may include a first color filter CF1 and a first light receiving element PD1, and the second pixel PX2 may include a second color filter CF2 and a second light receiving element PD2. The first color filter CF1 and the second color filter CF2 may have the same color (e.g., green).

The first pixel PX1, the second pixel PX2, the third pixel PX3, and the fourth pixel PX4 may be arranged adjacent to each other, and may share one microlens ML. The microlens ML may have a convex shape to condense light incident on unit pixels (e.g., the first pixel PX1, the second pixel PX2, the third pixel PX3, and the fourth pixel PX4). The microlens ML may have a hemispherical cross section. From a planar point of view, the microlens ML may have a circular shape. When the microlens ML is included, sensitivity of the image sensor IS may be improved. That is, the optical characteristics of the image sensor IS may be improved.

The color arrangement illustrated in FIG. 3D is an arrangement of a Bayer pattern. As illustrated, one unit pattern includes four quadrant regions, and the first to fourth quadrants may represent red (R), green (G), blue (B), and green (G), respectively. These unit patterns are two-dimensionally and repeatedly arranged in the first direction (X direction) and the second direction (Y direction). For this color arrangement, two green pixels may be placed in one diagonal direction within a unit pattern in the form of a 2×2 array, and one blue pixel and one red pixel may be placed in the other diagonal direction, respectively. In other words, a first row in which a plurality of green pixels and a plurality of blue pixels are alternately arranged along the first direction, and a second row in which a plurality of red pixels and a plurality of green pixels are alternately arranged along the first direction may be repeatedly arranged along the second direction.

Hereinbelow, it has been described that a pixel array PXA of the image sensor IS has a Bayer pattern, but the operating principle may also be applied to pixel arrangements of the other patterns other than the Bayer pattern (e.g., quad Bayer pattern, quad square Bayer pattern, etc.).

The pixel array PXA of the image sensor IS may be equipped with a color separation lens array that condenses light of a color to correspond to this color arrangement, that is, light of a color corresponding to a specific pixel.

Referring to FIG. 3E, the pixel array PXA may include a plurality of pixels for sensing incident light. The pixel array PXA may include a plurality of unit pixel groups PXA_G. Each of the plurality of unit pixel groups PXA_G may include a first sub-group pixel 111, a second sub-group pixel 112, a third sub-group pixel 113, and a fourth sub-group pixel 114, which convert incident light into electrical signals to generate image signals. The unit pixel group PXA_G may have a pixel arrangement in the form of a Bayer pattern. That is, the first sub-group pixel 111 and the fourth sub-group pixel 114 may be green pixels for sensing green light, and the second sub-group pixel 112 may be a red pixel for sensing red light, and the third sub-group pixel 113 may be a blue pixel for sensing blue light. Each of the first through fourth sub-group pixels 111, 112, 113, and 114 may include a plurality of optical sensing cells that sense incident light independently. For example, each of the first through fourth sub-group pixels 111, 112, 113, and 114 may include first through fourth optical sensing cells ce1, ce2, ce3, and ce4. The first through fourth optical sensing cells ce1, ce2, ce3, and ce4 may be two-dimensionally arranged in a first direction (X direction) and a second direction (Y direction). For example, in each of the first through fourth pixels 111, 112, 113, and 114, the first through fourth optical sensing cells ce1, ce2, ce3, and ce4 may be arranged in a 2×2 array form.

FIG. 3E illustrates that each of the first through fourth sub-group pixels 111, 112, 113 and 114 includes four optical sensing cells, but four or more independent optical sensing cells may be grouped and two-dimensionally arranged. For example, each of the first through fourth sub-group pixels 111, 112, 113, and 114 may be grouped in a 3×3 array form or 4×4 array form and may include a plurality of independent optical sensing cells. Hereinafter, for convenience, the case where each of the first through fourth sub-group pixels 111, 112, 113 and 114 includes optical sensing cells arranged in a 2×2 array form.

Some of the plurality of pixels including a plurality of optical sensing cells for sensing light of the same color may be utilized as an automatic focusing pixel. In the automatic focusing pixel, an automatic focusing signal may be obtained from a difference between output signals of adjacent optical sensing cells. For example, an automatic focusing signal in the first direction (X direction) may be generated from a difference between an output signal of the first optical sensing cell ce1 and an output signal of the second optical sensing cell ce2, a difference between an output signal of the third optical sensing cell ce3 and an output signal of the fourth optical sensing cell ce4, or a difference between the sum of the output signals of the first optical sensing cell ce1 and the third optical sensing cell ce3 and the sum of the output signals of the second optical sensing cell ce2 and the fourth optical sensing ce4. Also, an automatic focusing signal in the second direction (Y direction) may be generated from a difference between an output signal of the first optical sensing cell ce1 and an output signal of the third optical sensing cell ce3, a difference between an output signal of the second optical sensing cell ce2 and an output signal of the fourth optical sensing cell ce4, or a difference between the sum of the output signals of the first optical sensing cell ce1 and the second optical sensing cell ce2 and the sum of the output signals of the third optical sensing cell ce3 and the fourth optical sensing ce4.

A method for obtaining a general image signal may include a Sum mode and a Full mode. In the Sum mode, the output signals of the first through fourth optical sensing cells ce1, ce2, ce3, and ce4 may be added to one another to obtain an image signal. For example, a first green image signal may be generated by adding the output signals of the first through fourth optical sensing cells ce1, ce2, ce3, and ce4 of the first sub-group pixel 111, and a red image signal may be generated by adding the output signals of the first through fourth optical sensing cells ce1, ce2, ce3, and ce4 of the second sub-group pixel 112, and a blue image signal may be generated by adding the output signals of the first through fourth optical sensing cells ce1, ce2, ce3, and ce4 of the third sub-group pixel 113, and a second green image signal may be generated by adding the output signals of the first through fourth optical sensing cells ce1, ce2, ce3, and ce4 of the fourth sub-group pixel 114. In the Full mode, each of the first through fourth optical sensing cells ce1, ce2, ce3, and ce4 may be used as a separate pixel to obtain each output signal. In this case, an image with high resolution may be obtained.

The first through fourth optical sensing cells ce1, ce2, ce3, and ce4 may be electrically separated from each other by an isolation structure DTI. The isolation structure DTI may be formed to have, for example, a deep trench isolation structure. The deep trench may be filled with air or electrically-insulating materials. After an optical sensing layer is formed, the isolation structure DTI may be formed on the optical sensing layer to form a plurality of cells electrically separated from one another. The isolation structure DTI may be a structure in which the first through fourth sub-group pixels 111, 112, 113 and 114 are electrically separated and also each of the first through fourth sub-group pixels 111, 112, 113 and 114 is electrically separated into four regions. A cross-shaped isolation line SL indicated in the drawing may be included in each of, in particular, the first through fourth sub-group pixels 111, 112, 113 and 114 of the isolation structure DTI, and may indicate a central line of the isolation structure DTI for separating each of the first through fourth sub-group pixels 111, 112, 113, and 114 into a plurality of optical sensing cells ce1, ce2, ce3, and ce4. In the drawing, the isolation structure DTI is displayed in a line with no thickness, which is shown for convenience, and the isolation structure DTI may have a thickness that physically separates adjacent optical sensing cells. The isolation structure DTI included in the first through fourth sub-group pixels 111, 112, 113, and 114 may be a region in which light is not sensed. Thus, a scheme for reducing performance degradation due to the isolation structure may be considered in the design of a meta-prism array to be described below.

Referring to FIG. 3F, the meta-prism array MP may include a plurality of pixel correspondence regions. The meta-prism array MP may include a plurality of unit pixel groups PXA_G and a plurality of pixel correspondence groups MP_G corresponding to the plurality of unit pixel groups PXA_G shown in FIG. 3E. The pixel correspondence group MP_G may include first through fourth sub-group pixel correspondence regions 131, 132, 133, and 134 respectively corresponding to the first through fourth sub-group pixels 111, 112, 113, and 114. Each of the first through fourth sub-group pixel correspondence regions 131, 132, 133, and 134 may include a plurality of nanoposts (not shown). The plurality of nanoposts may be configured to separate incident light according to a wavelength and collect the incident light in first to fourth sub-group pixels 111, 112, 113, and 114 corresponding to each wavelength. As shown in FIG. 3E, the first sub-group pixel 111 and the fourth sub-group pixel 114 may be a first green pixel and a second green pixel, respectively, and the second sub-group pixel 112 may be a red pixel, and the third sub-group pixel 113 may be a blue pixel.

The shape and the arrangement of the plurality of nanoposts included in the meta-prism array MP may be defined to form phase distribution suitable for wavelength separation.

Referring back to FIG. 2B, the communication circuit 230*b* may transmit or receive data to or from the external electronic device (e.g., the electronic devices 102 and 104 of FIG. 1, the server 108 or the electronic device 200*a* of FIG. 2A). For example, the communication circuit 230*b* may transmit or receive an image and/or a moving image to or from an external electronic device. For example, the communication circuit 230*b* may receive an artificial intelligence learning model from the external electronic device.

The memory 240*b* may include instructions executed by the processor 250*b*. The memory 240*b* may store an image and/or a moving image captured by the camera 220*b*, or may store the image and/or the moving image received from the external electronic device.

The processor 250*b* may control the overall operation of the electronic device 200*b*. The processor 250*b* may capture an image through the camera 220*b*.

The processor 250*b* may compensate for the captured image based on the artificial intelligence learning model. For example, the processor 250*b* may receive the artificial intelligence learning model from the external electronic device (e.g., the electronic device 200*a* of FIG. 2A) through the communication circuit 230*b* and may compensate for the captured image based on the received artificial intelligence learning model.

The image signal processor ISP of FIG. 3A may include a processing logic based on a neural network learning model. In this case, the image signal processor ISP instead of the processor 250*b* may perform image data compensation processing to provide the compensation-processed image data to the processor 250*b*.

Some configuration may be omitted from the electronic device 200*b*, or at least a portion of the configuration of the electronic device 101 shown in FIG. 1 may be further included.

Hereinafter, a method for generating a training dataset (e.g., an input image and a target image) of a neural network learning model in the processor (e.g., 120 of FIG. 1, 230*a* of FIG. 2A, 250*b* of FIG. 2B) or an image signal processor (ISP of FIG. 3A) will be described in detail with reference to FIGS. 4 through 12.

Figure 4:
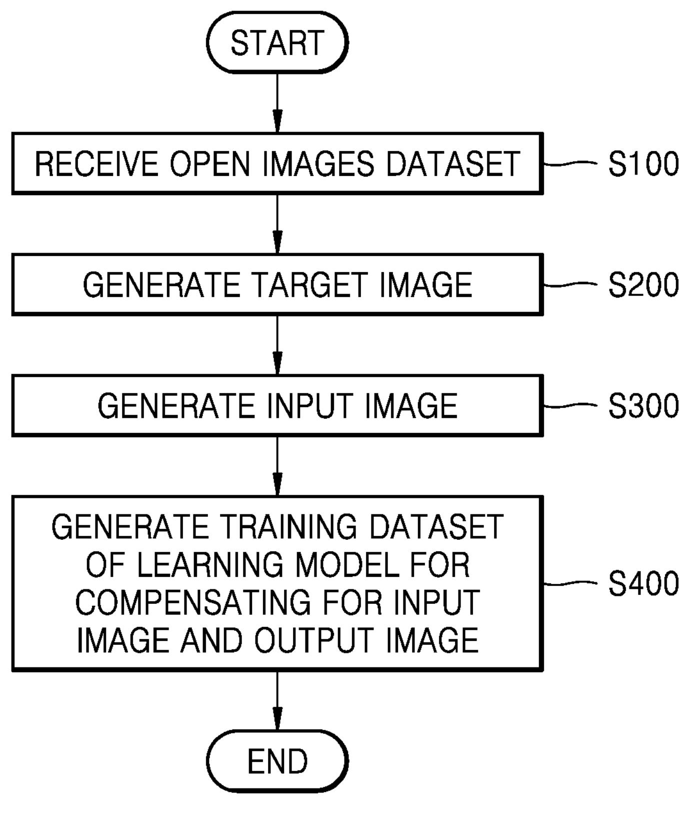
FIG. 4 is a flowchart illustrating a method for generating a training dataset of a neural network learning model according to an embodiment.
Figure 5:
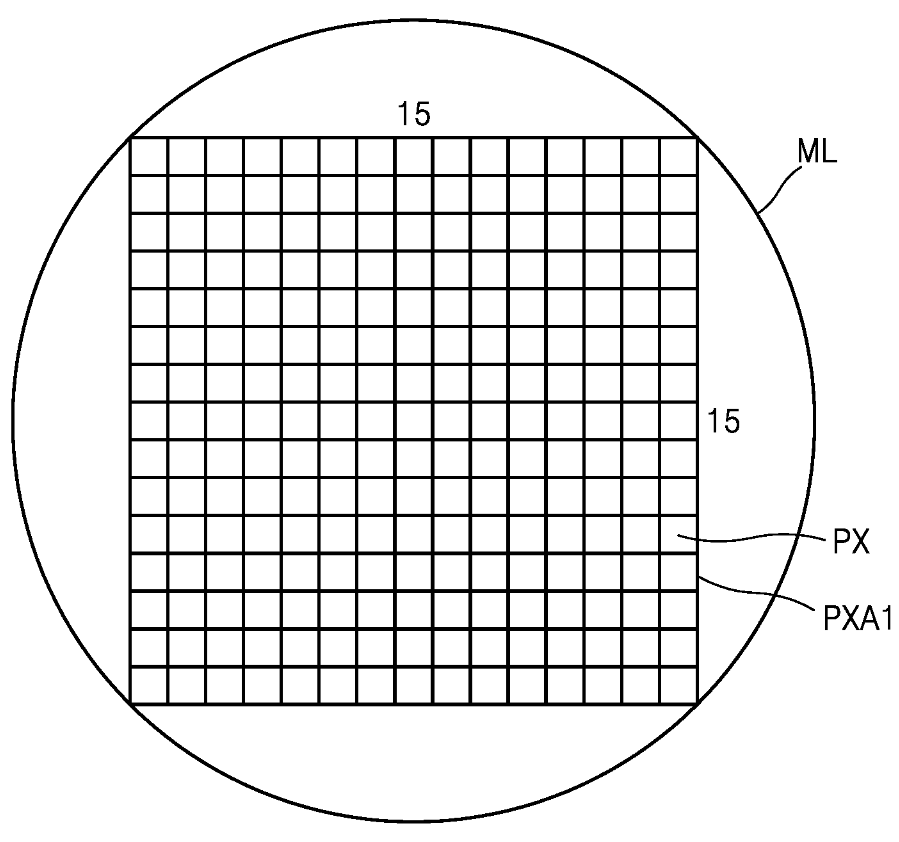
FIG. 5 is a plan view of one region of a pixel array of a light field camera according to an embodiment.
Figure 6A:
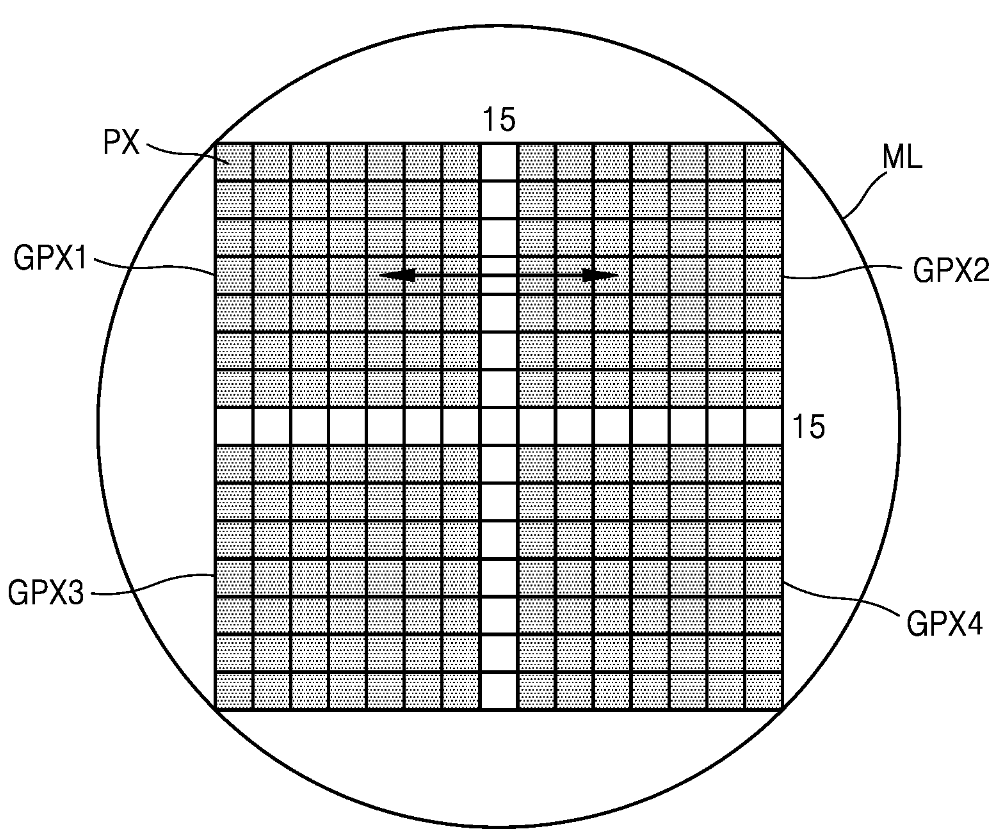
FIG. 6A is a view for describing pixel binning of an open images dataset.
Figure 6B:
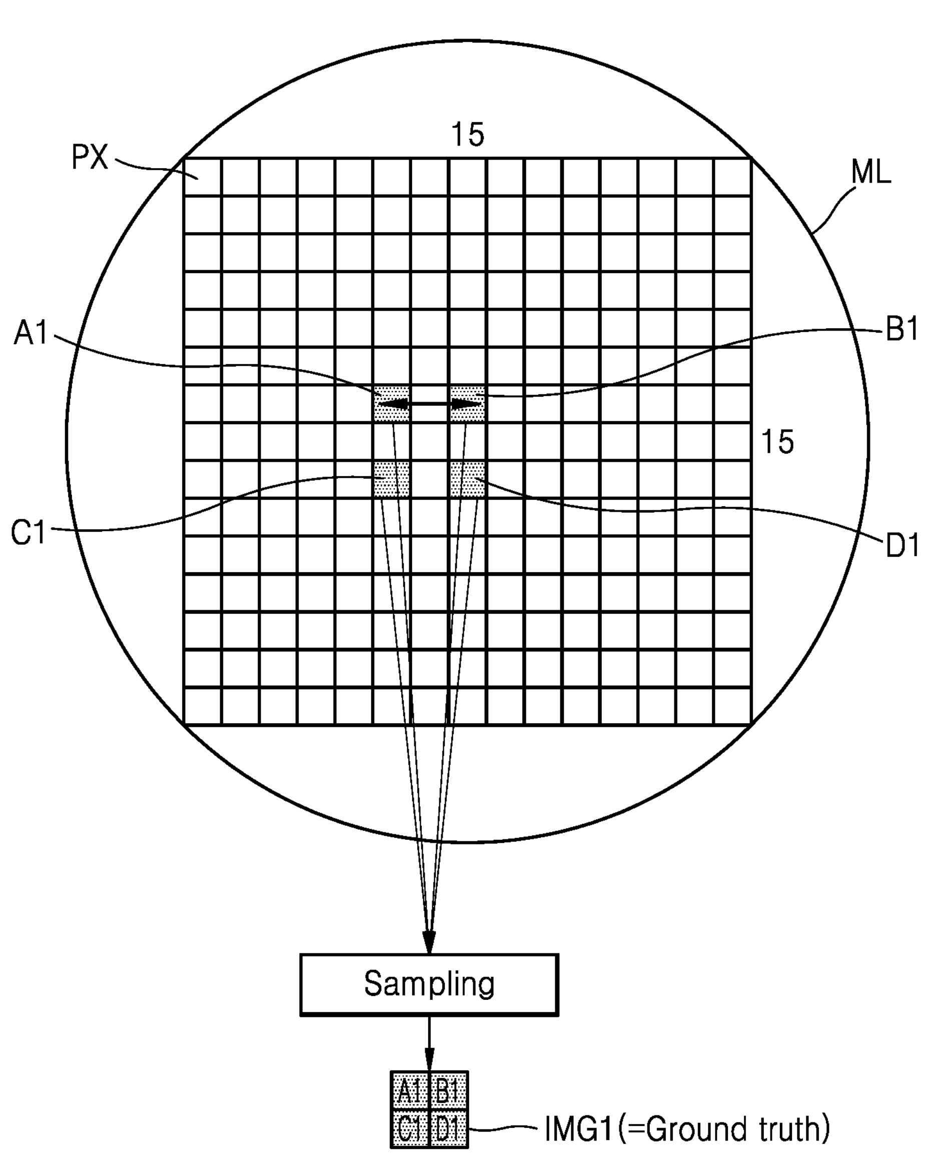
FIG. 6B is a view for describing a method for generating a target image using sampling of an open images dataset according to an embodiment.
Figure 7:
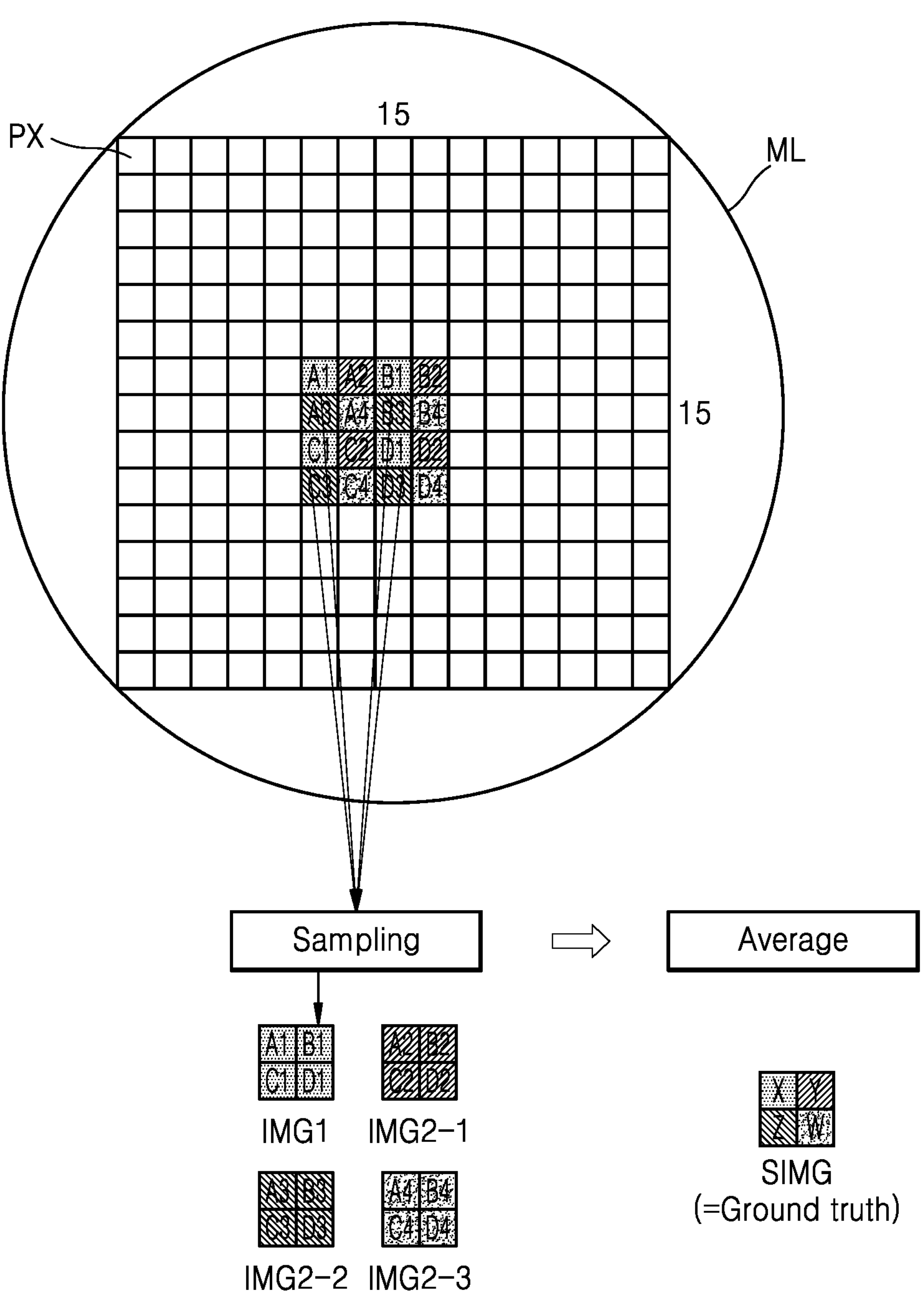
FIG. 7 is a view for describing a method for generating a target image using parallax restoration and sub-pixel shift of the open images dataset.
Figure 8:
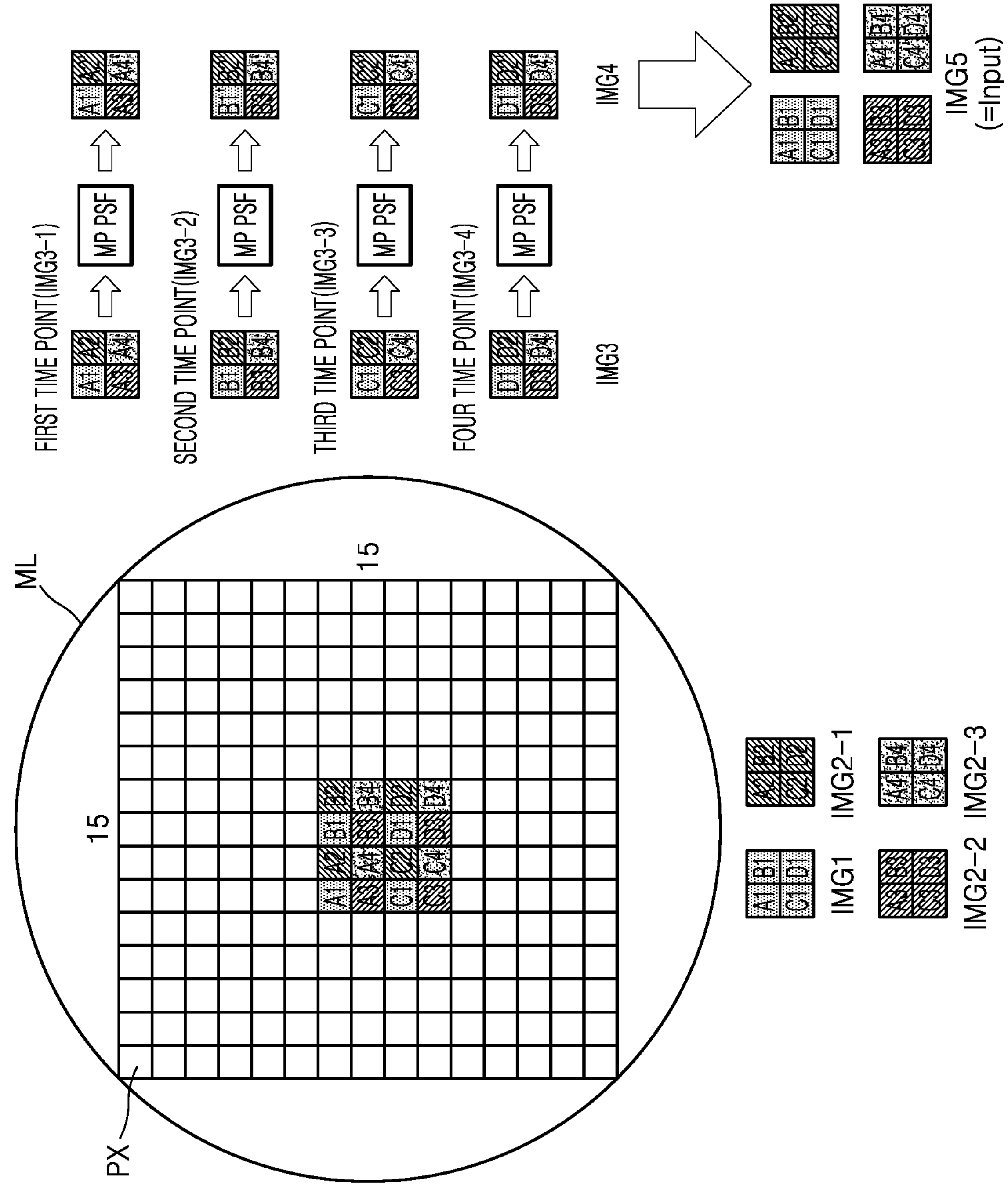
FIG. 8 is a view for describing a method for generating an input image.
Figure 10:
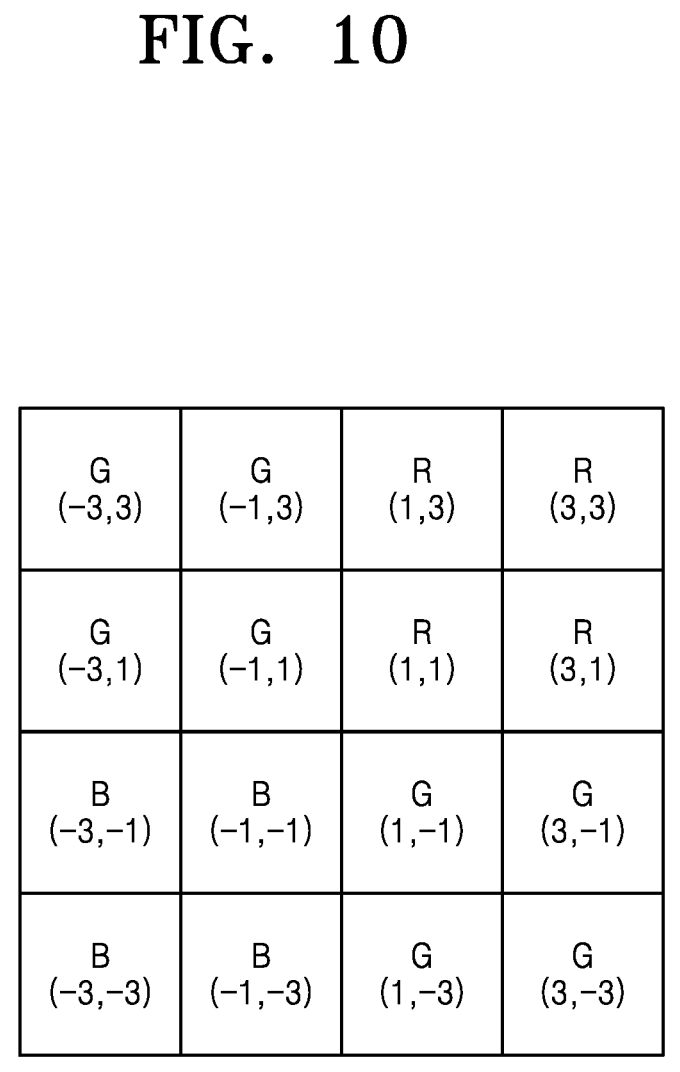
Figure 12:
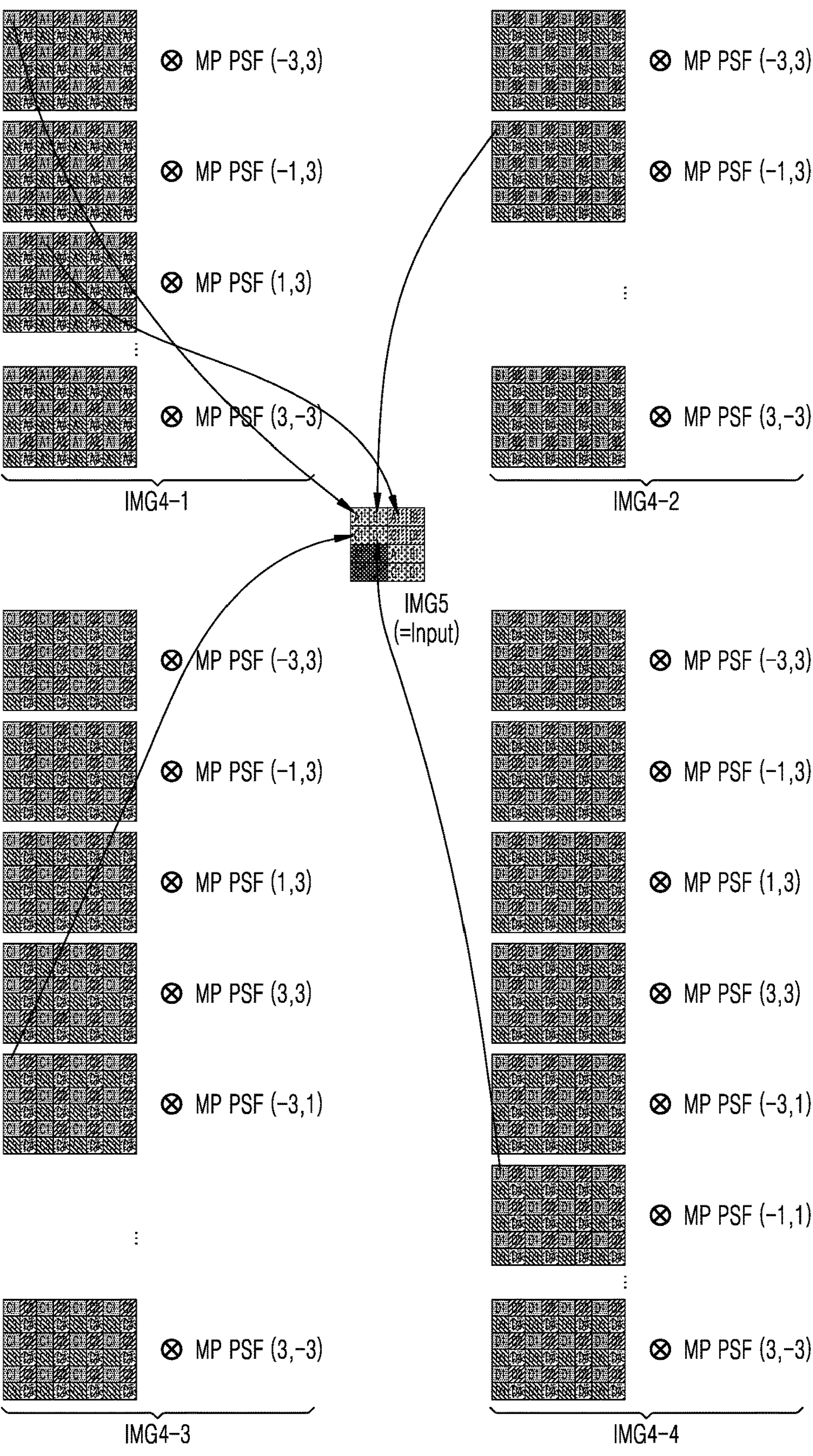
FIG. 12 is a view for describing a method for generating a fifth image.

FIG. 4 is a flowchart illustrating a method for generating a training dataset of a neural network learning model according to an embodiment. FIG. 5 is a plan view of one region of a pixel array of a light field camera according to an embodiment. FIG. 6A is a view for describing pixel binning of an open images dataset. FIG. 6B is a view for describing a method for generating a target image using sampling of an open images dataset according to an embodiment. FIG. 7 is a view for describing a method for generating a target image using parallax restoring and sub-pixel shift of the open images dataset. FIG. 8 is a view for describing a method for generating an input image. FIG. 9 is a view for describing a method of sampling a third image according to an embodiment. FIG. 10 is a view for describing filtering using a point spread function. FIG. 11 is a view for describing a method for generating a fourth image and a fifth image. FIG. 12 is a view for describing a method for generating a fifth image.

Referring to FIG. 4, a method for generating a training dataset of a neural network learning model according to an embodiment may include receiving an open images dataset (S100), generating a target image from the open images dataset (S200), generating an input image from the open images dataset (S300), and generating a target image and an input image as a training dataset of the neural network learning model for compensating for an image captured by an image sensor including a meta-prism and a pixel array (S400).

Specifically, in operation S100, the processor (e.g., 120 of FIG. 1, 230*a* of FIG. 2A, 250*b* of FIG. 2B) or the image signal processor (ISP of FIG. 3A) of the electronic device (e.g., 101 of FIG. 1, 200*a* of FIG. 2A, 200*b* of FIG. 2B) may receive an open images dataset from memory (or an external electronic device). In other words, the memory (e.g., 220*a* of FIG. 2A, 240*b* of FIG. 2B) may store instructions to receive the open images dataset by using the processor (e.g., 120 of FIG. 1, 230*a* of FIG. 2A, 250*b* of FIG. 2B).

The open images dataset may include an image previously stored in the memory of the electronic device, an image received from the external electronic device, and/or an image obtained through crawling. For example, the open images dataset may be a light field dataset generated by a light field image sensor.

Since the image sensor IS described with reference to FIGS. 3A through 3C corresponds to a light field image sensor, a training dataset of a neural network learning model may be generated using the disclosed set of light field data. Since the light field dataset reflects the noise and the characteristics of the lens generated during imaging, a better effect is expected in terms of the learning result than the simulated dataset through computer graphics. The light field dataset may be a dataset captured by a camera such as those manufactured by Lytro, Inc.

Referring to FIG. 5, the pixel array PXA1 of the light field camera according to an embodiment may include 225 pixels PX arranged in 15×15 (15 rows 15 columns) under one microlens ML. Thus, the light field camera may express 15 depths. The reason for making a camera having a long focal length is because, as it becomes zoom, the re-focusing effect may be generated even in an object far from the camera by using the characteristic that a depth of field (DOF) is reduced. The pixel array PXA1 may include a filter converted into a full color pixel.

For convenience of explanation, FIG. 5 illustrates that the area of the microlens ML is greater than the area of the pixel array PXA1. However, it should be understood that the arrangement shape of the microlens ML and the pixel array PXA1 is substantially the same as the arrangement shape of the meta-prism array MP and the pixel array PXA of FIG. 3B.

Referring back to FIG. 4, in operation S200, a target image may be generated from the received open images dataset.

Generating of a target image (S200) may include sampling to generate a first image dataset from the open images dataset based on parallax between pixels of the image sensor.

Referring to FIG. 6A, in the case of binning (or pixel grouping) by dividing pixels PX arranged in 15×15 (15 rows and 15 columns) under one microlens ML, a pixel array PXA pattern in which four pixels PX1, PX2, PX3, and PX4 are arranged under one meta-prism array MP as in the pixel array PXA shown in FIG. 3B may be easily generated. However, in this case, parallax between grouped pixels GPX1, GPX2, GPX3, and GPX4 may be different from parallax between pixels PX1, PX2, PX3, and PX4 in the pixel array PXA shown in FIG. 3B.

Thus, as shown in FIG. 6B, the pixels A1, B1, C1, and D1 having substantially the same parallax as parallax (or a distance between pixels) between the pixels PX1, PX2, PX3, and PX4 in the pixel array PXA shown in FIG. 3B may be sampled so that a first image dataset IMG1 may be generated. Thus, it is possible to minimize a difference in parallax between a training dataset modeled from an open images dataset and pixels of an image sensor to be actually applied. In this case, each of the pixels included in the first image dataset IMG1 may include RGB color information.

Since the first image dataset IMG1 corresponds to a raw image in which blur due to a meta-prism array MP is not generated, the first image dataset IMG1 may be used as a target image (or Ground truth) of a training dataset for a learning model.

Referring to FIG. 7, in generating of the target image (S200), the processor (e.g., 120 of FIG. 1, 230*a* of FIG. 2A, 250*b* of FIG. 2B) or the image signal processor (ISP of FIG. 3A) may perform generating (or sampling) a plurality of second image datasets IMG2-1, IMG2-2, and IMG2-3 having a sub-pixel shift relationship with the first image dataset IMG1, and generating a synthesized image dataset SIMG by using an average of each of the first image dataset IMG1 and the plurality of second image datasets IMG2-1, IMG2-2, and IMG2-3.

The plurality of second image datasets having the sub-pixel shift relationship with the first image dataset IMG1 may include a (2-1)-th image dataset IMG2-1 corresponding to a right adjacent pixel of the first image dataset IMG1, a (2-2)-th image dataset IMG2-2 corresponding to a lower adjacent pixel of the first image dataset IMG1, and a (2-3)-th image dataset IMG2-3 corresponding to a right lower diagonal-side adjacent pixel of the first image dataset IMG1.

In this case, the first image dataset IMG1 may include a pixel A1 corresponding to a first time point, a pixel B1 corresponding to a second time point, a pixel C1 corresponding to a third time point, and a pixel D1 corresponding to a fourth time point. In addition, the (2-1)-th image dataset IMG2-1 may include a pixel A2 corresponding to a first time point, a pixel B2 corresponding to a second time point, a pixel C2 corresponding to a third time point, and a pixel D2 corresponding to a fourth time point. In addition, the (2-2)-th image dataset IMG2-2 may include a pixel A3 corresponding to a first time point, a pixel B3 corresponding to a second time point, a pixel C3 corresponding to a third time point, and a pixel D3 corresponding to a fourth time point. Likewise, the (2-3)-th image dataset IMG2-3 may include a pixel A4 corresponding to a first time point, a pixel B4 corresponding to a second time point, a pixel C4 corresponding to a third time point, and a pixel D4 corresponding to a fourth time point.

The target image may be a synthesized image dataset SIMG including an image X generated by averaging values of the pixels A1, B1, C1, and D1 of the first image dataset IMG1, an image Y generated by averaging values of the pixels A2, B2, C2, and D2 of the (2-1)-th image dataset IMG2-1, an image Z generated by averaging values of the pixels A3, B3, C3, and D3 of the (2-2)-th image dataset IMG2-2, and an image W generated by averaging values of the pixels A4, B4, C4, and D4 of the (2-3)-th image dataset IMG2-3.

In this way, when an image is generated by averaging of the values of the sampled pixels (e.g., A1, B1, C1, and D1) of the first image dataset IMG1, an image X in which parallax is restored, may be obtained. However, since resolution is reduced to half due to a reduction in the size of the image, when the synthesized image dataset SIMG is generated using the images Y, Z and W in which parallaxes are restored with respect to each of the second image datasets IMG2-1, IMG2-2 and IMG2-3 having the sub-pixel shift relationship with the first image dataset IMG1, a parallax-restored image having enhanced resolution may be obtained. Thus, the synthesized image dataset SIMG may be utilized as a target image performed until demosaicing.

Referring back to FIG. 4, in operation S300, an input image may be generated from the received open images dataset.

Referring to FIG. 8, in operation S300 of generating an input image according to an embodiment, the processor (e.g., 120 of FIG. 1, 230*a* of FIG. 2A or the image signal processor (ISP of FIG. 3A) may perform generating a plurality of third image datasets IMG3 by sampling pixels of each of the plurality of second image datasets IMG2-1, IMG2-2, and IMG2-3 having the sub-pixel shift relationship with the pixels A1, B1, C1, and D1 according to a time point of the first image dataset IMG1.

Specifically, the third image dataset IMG3 may include a (3-1)-th image dataset IMG3-1 of a first time point, a (3-2)-th image dataset IMG3-2 of a second time point, a (3-3)-th image dataset IMG3-3 of a third time point, and a (3-4)-th image dataset IMG3-4 of a fourth time point.

The (3-1)-th image dataset IMG3-1 may be generated by sampling a pixel A2 of the (2-1)-th image dataset IMG2-1, a pixel A3 of the (2-2)-th image dataset IMG2-2, and a pixel A4 of the (2-3)-th image dataset IMG2-3 having a sub-pixel shift relationship with a pixel A1 corresponding to the first time point of the first image dataset IMG1.

The (3-2)-th image dataset IMG3-2 may be generated by sampling a pixel B2 of the (2-1)-th image dataset IMG2-1, a pixel B3 of the (2-2)-th image dataset IMG2-2, and a pixel B4 of the (2-3)-th image dataset IMG2-3 having a sub-pixel shift relationship with a pixel B1 corresponding to the second time point of the first image dataset IMG1.

The (3-3)-th image dataset IMG3-3 may be generated by sampling a pixel C2 of the (2-1)-th image dataset IMG2-1, a pixel C3 of the (2-2)-th image dataset IMG2-2, and a pixel C4 of the (2-3)-th image dataset IMG2-3 having a sub-pixel shift relationship with a pixel C1 corresponding to the third time point of the first image dataset IMG1.

In addition, the (3-4)-th image dataset IMG3-4 may be generated by sampling a pixel D2 of the (2-1)-th image dataset IMG2-1, a pixel D3 of the (2-2)-th image dataset IMG2-2, and a pixel D4 of the (2-3)-th image dataset IMG2-3 having a sub-pixel shift relationship with a pixel C1 corresponding to the fourth time point of the first image dataset IMG1.

Referring to FIG. 9, the (3-1)-th image dataset IMG3-1 may include pixels A1, A2, A3, and A4 corresponding to microlenses ML11 through ML34, respectively, included in the light field camera. Also, the (3-2)-th image dataset IMG3-2 may include pixels B1, B2, B3, and B4 corresponding to microlenses ML11 through ML34, respectively, included in the light field camera. Also, the (3-3)-th image dataset IMG3-3 may include pixels C1, C2, C3, and C4 corresponding to microlenses ML11 through ML34, respectively, included in the light field camera. Likewise, the (3-4)-th image dataset IMG3-4 may include pixels D1, D2, D3, and D4 corresponding to microlenses ML11 through ML34, respectively, included in the light field camera.

Referring back to FIG. 8, the processor (e.g., 120 of FIG. 1, 230*a* of FIG. 2A, 250*b* of FIG. 2B) or the image signal processor (ISP of FIG. 3A) may perform generating a fourth image set IMG4 by filtering the third image dataset IMG3 based on a point spread function of a meta-prism MP PSF and generating a fifth image dataset IMG5 by sampling the fourth image dataset IMG4 into a pattern of a pixel array (e.g., a quad Bayer pattern). In this case, since parallax exists in the fifth image dataset IMG5 and corresponds to a blur-processed image, the fifth image dataset IMG5 may be utilized as an input image (or Input) of a training dataset for a learning model.

Hereinafter, a method for generating the fourth image IMG4 and the fifth image IMG5 from the third image IMG3 by using the processor (e.g., 120 of FIG. 1, 230*a* of FIG. 2A, 250*b* of FIG. 2B) or the image signal processor (ISP of FIG. 3A) will be described in detail with reference to FIGS. 10 through 12.

Referring to FIG. 10, the point spread function of the meta-prism MP PSF may have a repeating pattern in the unit of 4×4 matrix and may have different frequency characteristics for each of elements of the 4×4 matrix.

When red light is incident on the red pixel R (e.g., (1,3), (3,3), (1,1), (3,1) coordinates), the red pixel R may absorb light, but when green light and blue light are incident on the red pixel R, the red pixel R may not absorb light but may branch to peripheral pixels.

When green light is incident on the green pixel G (e.g., (−3,3), (−1,3), (−3,1), (−1,1), (3,−1), (1,−3), (3,−3) coordinates), the green pixel G may absorb light, but when red light and blue light are incident on the green pixel G, the green pixel G may not absorb light but may branch to peripheral pixels. Likewise, blue light is incident on the blue pixel B (e.g., (−3,−1), (−1,1), (−3,3), (−1,−3) coordinates), the blue pixel B may absorb light, but when red light and green light are incident on the blue pixel B, the blue pixel B may not absorb light but may branch to peripheral pixels. The point spread function of the meta-prism MP PSF may represent the degree of a preset amount of light branched to adjacent pixels for each type of light incident on each coordinate (or element).

Referring to FIGS. 11 and 12, digital filtering may be performed on the third image dataset IMG3 using the point spread function of the meta-prism MP PSF, thereby generating a fourth image dataset IMG4. Specifically, the (3-1)-th image dataset IMG3-1 may be generated by performing a convolution operation with the point spread function of the meta-prism MP PSF of all coordinates (i.e., 16) to generate a (4-1)-th image dataset IMG4-1. In addition, the (3-2)-th image dataset IMG3-3 may be generated by performing a convolution operation with the point spread function of the meta-prism MP PSF of all coordinates (i.e., 16) to generate a (4-2)-th image dataset IMG4-2. In addition, the (3-3)-th image dataset IMG3-3 may be generated by performing a convolution operation with the point spread function of the meta-prism MP PSF of all coordinates (i.e., 16) to generate a (4-3)-th image dataset IMG4-3. Likewise, the (3-4)-th image dataset IMG3-4 may be generated by performing a convolution operation with the point spread function of the meta-prism MP PSF of all coordinates (i.e., 16) to generate a (4-4)-th image dataset IMG4-4.

Subsequently, a fifth image dataset IMG5 may be generated by sampling pixels corresponding to respective coordinates of the point spread function of the meta-prism MP PSF among the fourth image datasets IMG4. For example, in the (4-1)-th image dataset IMG4-1, a pixel A1 corresponding to a (−3,3) coordinate may correspond to a green pixel G corresponding to a (−3,3) coordinate of the fifth image dataset IMG5, and in the (4-1)-th image dataset IMG4-1, a pixel A1 corresponding to a (1,3) coordinate may correspond to a red pixel R corresponding to a (1,3) coordinate of the fifth image dataset IMG5. In addition, in the (4-2)-th image dataset IMG4-2, a pixel B1 corresponding to a (−1,3) coordinate may correspond to a green pixel G corresponding to a (−1,3) coordinate of the fifth image dataset IMG5. In addition, in the (4-3)-th image dataset IMG4-3, a pixel C1 corresponding to a (−3,1) coordinate may correspond to a green pixel G corresponding to a (−3,1) coordinate of the fifth image dataset IMG5. Likewise, in the (4-4)-th image dataset IMG4-4, a pixel D1 corresponding to a (−1,1) coordinate may correspond to a green pixel G corresponding to a (−1,1) coordinate of the fifth image dataset IMG5.

As described above, since parallax exists in the fifth image dataset IMG5 and corresponds to a blur-processed image, the fifth image dataset IMG5 may be utilized as an input image (or Input) of a training dataset for a learning model. The fifth image dataset IMG5 may be a quad Bayer pattern in which pixels arranged in a 2×2 matrix are arranged in the same color, and each of the pixels included in the fifth image dataset IMG5 may include only one color information corresponding to the quad Bayer pattern.

The processor (e.g., 120 of FIG. 1, 230*a* of FIG. 2A, 250*b* of FIG. 2B) or the image signal processor (ISP of FIG. 3A) may use the fifth image dataset IMG5 of FIG. 11 as an input image (or Input) of the training dataset of the artificial intelligence learning model, and may use the first image dataset IMG1 of FIG. 6B as a target image (or Ground truth). In this case, the training dataset may be an input generated by the blur by the meta-prism and configure a network for outputting an RGB image in which parallax and the degradation of the resolution of the resolution are restored.

The processor (e.g., 120 of FIG. 1, 230*a* of FIG. 2A, 250*b* of FIG. 2B) or the image signal processor (ISP of FIG. 3A) may use the fifth image dataset IMG5 of FIG. 11 as an input image (or Input) of the training dataset of the artificial intelligence learning model, and may use the synthesized image dataset SIMG of FIG. 7 as a target image (or Ground truth). In this case, the training dataset may be an input generated by the blur by the meta-prism and configure a network for outputting a raw image having a quad Bayer pattern in which parallax and the degradation of the resolution of the resolution are restored.

Hereinafter, a method of sampling a third image according to another embodiment will be described with reference to FIGS. 12 and 13. A description of redundant contents is omitted, and a difference therebetween will be described.

Figure 13:
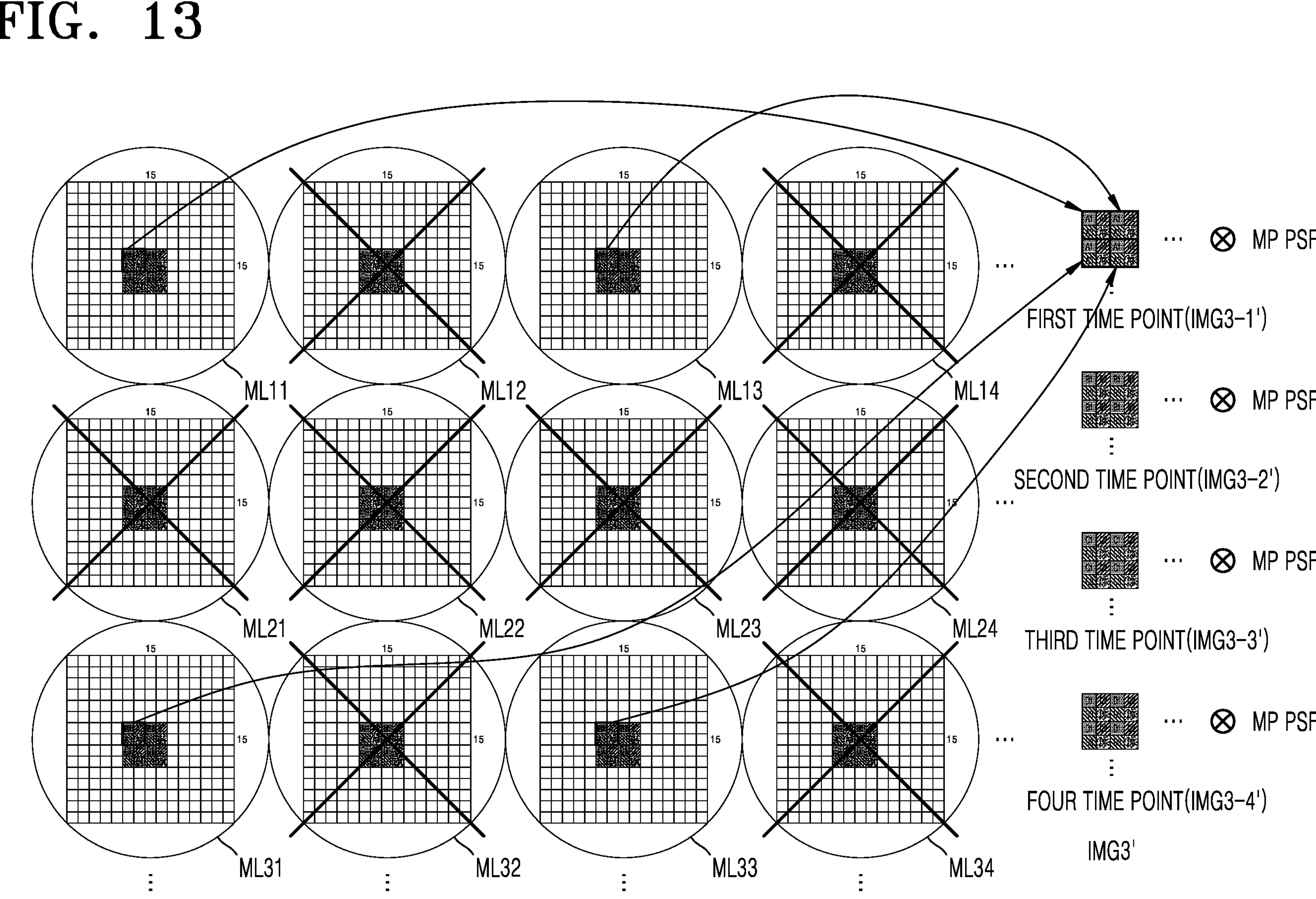
FIG. 13 is a view for describing a method of ½ sampling a third image dataset according to another embodiment.
Figure 14:
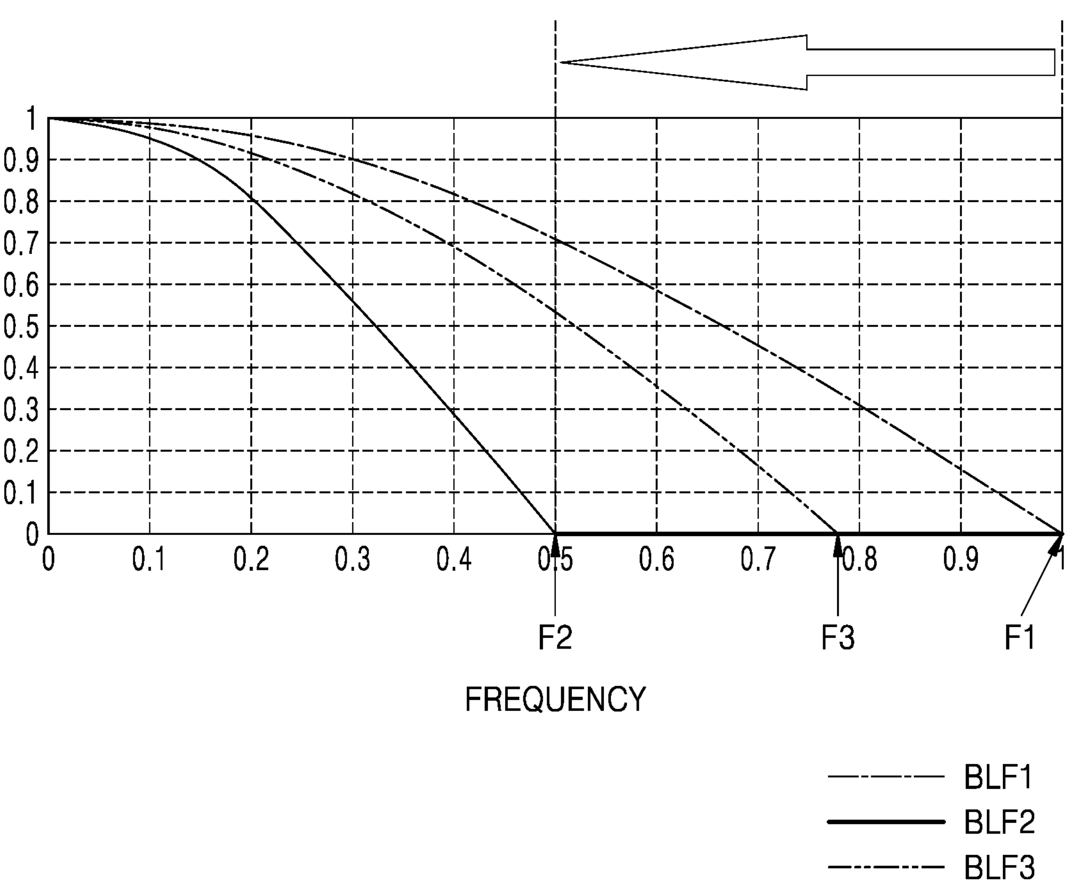
FIG. 14 is a view for describing the effect of ½ sampling.

FIG. 13 is a view for describing a method of ½ sampling a third image dataset according to another embodiment. FIG. 14 is a view for describing the effect of ½ sampling.

Referring to FIGS. 9 and 13, in sampling of the third image dataset IMG3, the embodiment illustrated in FIG. 13 is different from the embodiment of FIG. 12 in which all pixels corresponding to each of microlenses included in a light field camera are sampled in that only pixels corresponding to ½ of the pixels corresponding to each of the microlenses included in the light field camera are sampled, and the other components are substantially the same.

Referring to FIGS. 9 and 13, the processor (e.g., 120 of FIG. 1, 230*a* of FIG. 2A, 250*b* of FIG. 2B) or the image signal processor (ISP of FIG. 3A) may ½ sample the open images dataset so as to generate a first image dataset in generating of an input image (S300 of FIG. 4). In this case, the open images dataset may be generated using an image sensor in which a plurality of microlenses ML11 to ML34 are arranged in a matrix form and which includes a plurality of pixels PX under one microlens. In this case, the ½ sampling means one-by-one sampling in a horizontal and vertical direction with respect to a microlens from an open images dataset.

For example, a (3-1)'-th image dataset IMG3-1' may include pixels A1, A2, A3, and A4 corresponding to microlenses ML11, ML13, ML31, and ML33 arranged in odd columns and odd rows among microlenses ML11 through ML34 included in the light field camera. In addition, a (3-2)'-th image dataset IMG3-2' may include pixels B1, B2, B3, and B4 corresponding to microlenses ML11, ML13, ML31, and ML33 arranged in odd columns and odd rows among microlenses ML11 through ML34 included in the light field camera. In addition, a (3-3)'-th image dataset IMG3-3' may include pixels C1, C2, C3, and C4 corresponding to microlenses ML11, ML13, ML31, and ML33 arranged in odd columns and odd rows among microlenses ML11 through ML34 included in the light field camera. Likewise, a (3-4)'-th image dataset IMG3-4' may include pixels D1, D2, D3, and D4 corresponding to microlenses ML11, ML13, ML31, and ML33 arranged in odd columns and odd rows among microlenses ML11 through ML34 included in the light field camera.

Referring to FIG. 14, because the light field camera (e.g., a lytro camera) is a camera manufactured for re-focusing, a plurality of pixels (e.g., 15×15) may be added to one another under one microlens in various directions to form an image. Thus, an image captured by the light field camera may be a blur image. In terms of a Nyquist frequency, the Nyquist frequency corresponds to a first frequency F1 (for example, π), and thus it is considered that there is no high frequency signal and aliasing. When a first band-limit filter BLF1 in which a zero point is set, is applied to the first frequency F1, an all-passed signal may be obtained. It may be understood that the vertical axis means the ratio of image data that may be obtained by a processor for each frequency.

It is considered that when the ½ sampling of FIG. 13 is performed, since in terms of the Nyquist frequency, the first frequency F1 (e.g., π) is changed to a second frequency F2 (e.g., π/2), a high frequency signal is generated and aliasing is generated. In this case, a second band-limit filter BLF2 (e.g., a low-pass filter) in which a zero point is set at the second frequency F2, may be applied to remove aliasing. However, when the second band-limit filter BLF2 is applied, aliasing may be reduced, and resolution may be degraded.

Thus, it may be preferable to filter an open images dataset by using a second band-limit filter BLF2 (e.g., a low-pass filter) having a third frequency F3 (e.g., 0.7π to 0.8π) (or cut-off frequency) corresponding to 70% to 80% of the first frequency F1 (or a reference Nyquist frequency) before half sampling the open images dataset to minimize aliasing reduction and resolution degradation.

In a method and apparatus for generating a training dataset of a neural network learning model, sampling and/or filtering or the like may be performed based on an open images dataset so that the training dataset of the neural network learning model of an image sensor may be generated.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of generating a training dataset of a neural network learning model of an electronic device, the method comprising:

receiving an open images dataset;

generating a target image from the open images dataset;

generating an input image from the open images dataset; and generating a training dataset of a neural network learning model for compensating for an image captured by an image sensor that includes a meta-prism and a pixel array, the training dataset including the target image and the input image, wherein the generating the target image comprises sampling the open images dataset to generate a first image dataset based on pixels having parallax between pixels of the image sensor.

2. The method of claim 1, wherein the target image comprises the first image dataset.

3. The method of claim 1, wherein the generating the target image further comprises:

generating a plurality of second image datasets having a sub-pixel shift relationship with the first image dataset; and averaging the first image dataset and each of the plurality of second image datasets to generate a synthesized image.

4. The method of claim 3, wherein the plurality of second image datasets include a (2-1)-th image dataset corresponding to a right adjacent pixel of the first image dataset, a (2-2)-th image dataset corresponding to a lower adjacent pixel of the first image dataset, and a (2-3)-th image dataset corresponding to a right lower orthogonal-side adjacent pixel of the first image dataset.

5. The method of claim 4, wherein the target image is the synthesized image.

6. The method of claim 1, wherein the generating the input image further comprises:

sampling a pixel of each of a plurality of second image datasets having a sub-pixel shift relationship with another pixel according to a time point of the first image dataset to generate a plurality of third image datasets;

filtering the plurality of third image datasets based on a point spread function of the meta-prism to generate a fourth image dataset; and sampling the fourth image dataset as a pattern of the pixel array to generate a fifth image dataset.

7. The method of claim 6, wherein each of the pixels included in the first image dataset comprises RGB color information.

8. The method of claim 7, wherein the point spread function of the meta-prism has a repeating pattern in a unit of 4×4 matrix and has different frequency characteristics for each of elements of the 4×4 matrix.

9. The method of claim 7, wherein a pattern of the pixel array comprises a quad Bayer pattern in which pixels arranged in a 2×2 matrix comprise color filters of a same color, and each of the pixels included in the fourth image dataset comprises only one color information corresponding to the quad Bayer pattern.

10. The method of claim 6, wherein the generating the input image further comprises half sampling the open images dataset so as to generate the plurality of third image datasets.

11. The method of claim 10, wherein the open images dataset is generated by using an image sensor in which a plurality of microlenses are arranged in a matrix shape and which comprises a plurality of pixels under one microlens.

12. The method of claim 11, wherein the half sampling is one-by-one sampling in a horizontal and vertical direction with respect to the microlens from the open images dataset.

13. The method of claim 10, wherein the generating the input image further comprises, before the half sampling, filtering using a low pass filter having a cut-off frequency corresponding to 70% to 80% of a reference Nyquist frequency.

14. An electronic device comprising:

a communication circuit;

a memory; and a processor operatively connected to the memory, wherein the memory is configured to store instructions to receive an open images dataset from the processor during execution of the instructions, and wherein the processor is configured to execute the instructions to:

generate a target image from the open images dataset, generate an input image from the open images dataset, and generate a training dataset of a neural network learning model for compensating for an image captured by an image sensor that includes a meta-prism and a pixel array, the training dataset including the target image and the input image, wherein the processor is configured to execute the instructions to generate the target image by sampling the open images dataset to generate a first image dataset based on pixels having parallax between pixels of the image sensor.

15. The electronic device of claim 14, wherein the processor is configured to execute the instructions to generate the target image by:

generating a plurality of second image datasets having a sub-pixel shift relationship with the first image dataset, and averaging the first image dataset and each of the plurality of second image datasets to generate a synthesized image.

16. The electronic device of claim 14, wherein the processor is configured to execute the instructions to generate the input image by:

performing sampling of a pixel of each of the a plurality of second image datasets having a sub-pixel shift relationship with another pixel according to a time point of the first image dataset to generate a plurality of third image datasets, filtering the plurality of third image datasets based on a point spread function of the meta-prism to generate a fourth image dataset, and performing sampling of the fourth image dataset as a pattern of the pixel array to generate a fifth image dataset.

17. The electronic device of claim 16, wherein the processor is configured to execute the instructions to generate the input image by performing half sampling of the open images dataset to generate the plurality of third image datasets.

18. The electronic device of claim 17, wherein the processor is configured to execute the instructions to generate the input image by, before the half sampling, filtering using a low pass filter having a cut-off frequency corresponding to 70% to 80% of a reference Nyquist frequency.

* * * * *